United States Patent
Karapantelakis et al.

(10) Patent No.: US 11,870,661 B2
(45) Date of Patent: Jan. 9, 2024

(54) NETWORK SLICE INSTANCE PROVISIONING BASED ON A PERMISSIONED DISTRIBUTED LEDGER

(71) Applicant: Telefonaktiebolaget LM Ericsson (publ), Stockholm (SE)

(72) Inventors: Athanasios Karapantelakis, Solna (SE); Yifei Jin, Solna (SE); Ioannis Fikouras, Stockholm (SE); Maxim Teslenko, Sollentuna (SE); Lackis Eleftheriadis, Valbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/758,137

(22) PCT Filed: Jan. 2, 2020

(86) PCT No.: PCT/EP2020/050028
§ 371 (c)(1),
(2) Date: Jun. 29, 2022

(87) PCT Pub. No.: WO2021/136592
PCT Pub. Date: Jul. 8, 2021

(65) Prior Publication Data
US 2023/0040700 A1    Feb. 9, 2023

(51) Int. Cl.
*H04L 41/40*     (2022.01)
*H04L 41/5041*   (2022.01)

(52) U.S. Cl.
CPC .......... *H04L 41/40* (2022.05); *H04L 41/5048* (2013.01)

(58) Field of Classification Search
CPC ........................... H04L 41/40; H04L 41/5048
(Continued)

(56) References Cited

U.S. PATENT DOCUMENTS

2018/0123878 A1 * 5/2018 Li ........................... H04L 41/40
2021/0105628 A1 * 4/2021 Bishay ................ H04L 41/5054
(Continued)

FOREIGN PATENT DOCUMENTS

EP      4113940 A1 * 1/2023 ......... H04L 41/0806
WO     2018083664 A1   5/2018
(Continued)

OTHER PUBLICATIONS

Raphael Vicente Rosa; Christian Esteve Rothenberg, Blockchain-based Decentralized Applications for Multiple Administrative Domain Networking (XP011694134) (Year: 2018).*
(Continued)

*Primary Examiner* — Hee Soo Kim
(74) *Attorney, Agent, or Firm* — Nicholson De Vos Webster & Elliott LLP

(57) ABSTRACT

A method and system for deployment of services for customers. Network service templates (NSTs) are determined, from a permissioned distributed ledger that is distributed between network operator systems of one or more network operators and customer systems. The NSTs include respective descriptions of network characteristics that provide respective logical networks. A subset of the NSTs and a corresponding subset of the network operator systems are selected based on a service description of the first service for deployment of the first service. Instantiation of the subset of the NSTs is requested on the corresponding subset of network operator systems as a subset of network slice instances to form the first service deployed for the first customer.

17 Claims, 10 Drawing Sheets

(58) Field of Classification Search
USPC ........................................................ 709/223
See application file for complete search history.

(56) References Cited

U.S. PATENT DOCUMENTS

2021/0168705 A1* 6/2021 Fiorese ............... H04W 12/037
2022/0166667 A1* 5/2022 Celozzi .................. H04L 41/40

FOREIGN PATENT DOCUMENTS

WO  2019161936 A1  8/2019
WO  2019209149 A1  10/2019

OTHER PUBLICATIONS

International Search Report and Written Opinion for Application No. PCT/EP2020/050028, dated Aug. 28, 2020, 14 pages.
3GPP TS 28.530 V15.2.0, "3rd Generation Partnership Project; Technical Specification Group Services and System Aspects; Management and orchestration; Concepts, use cases and requirements (Release 15)," Sep. 2019, 29 pages, 3GPP Organizational Partners.
NGMN Alliance, "5G End-to-End Architecture Framework," Jan. 11, 2019, 49 pages, V1.1.5, Next Generation Mobile Networks.
Muneeb Ali et al., "Blockstack: A Global Naming and Storage System Secured by Blockchains," 2016, pp. 181-194, 2016 USENIX Annual Technical Conference, USENIX Association.
Jere Backman et al., "Blockchain Network Slice Broker in 5G Slice Leasing in Factory of the Future Use Case," 2017, 8 pages, IEEE.
Alisa Devlic et al., "NESMO: Network Slicing Management and Orchestration Framework," 2017, 7 pages, ICC2017: WT01-5GArch 2017: 4th International Workshop on 5G Architecture, IEEE.
Raphael Vicente Rosa et al., "Blockchain-Based Decentralized Applications for Multiple Administrative Domain Networking," Sep. 2018, pp. 29-37, IEEE Communications Standards Magazine.
A. Sgambelluri et al., "Orchestration of Network Services Across Multiple Operators: The 5G Exchange Prototype," 2017, pp. 69-73, IEEE.
Tarik Taleb et al., "On Multi-domain Network Slicing Orchestration Architecture & Federated Resource Control," 2019, pp. 1-13, IEEE.

* cited by examiner

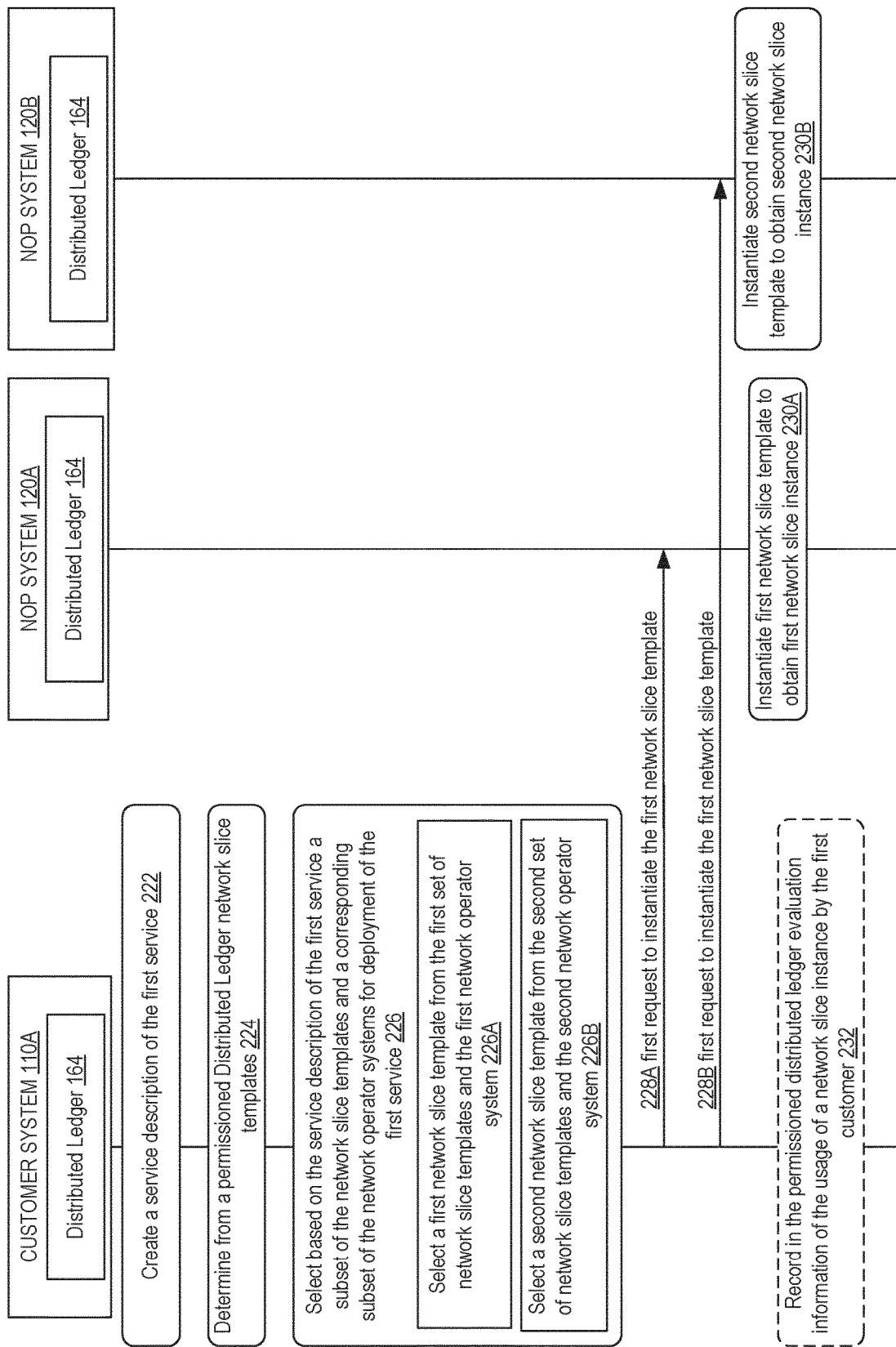

```
┌─────────────────────────────────────────────────────────────────────────┐
│ RECORD, IN A PERMISSIONED DISTRIBUTED LEDGER, A FIRST RECORD THAT       │
│ INCLUDES A FIRST IDENTIFIER OF A FIRST NETWORK OPERATOR AND A FIRST     │
│ LINK TO A SECOND SET OF RECORDS AND A SECOND LINK TO A THIRD SET OF     │
│ RECORDS                                                                 │
│                                  402                                    │
└─────────────────────────────────────────────────────────────────────────┘
                                    │
                                    ▼
┌─────────────────────────────────────────────────────────────────────────┐
│ RECORD, IN THE PERMISSIONED DISTRIBUTED LEDGER, A SECOND ONE OF THE     │
│ SECOND SET OF RECORDS THAT INCLUDES A FIRST ACCESS NETWORK              │
│ SPECIFICATION FOR NETWORK SLICE TEMPLATES OF THE FIRST NETWORK          │
│ OPERATOR SYSTEM                                                         │
│                                  403                                    │
│  ┌───────────────────────────────────────────────────────────────────┐  │
│  │ WHERE THE FIRST ACCESS NETWORK SPECIFICATION INCLUDES A           │  │
│  │ DESCRIPTION OF THE ACCESS NETWORK OF THE FIRST NETWORK            │  │
│  │ OPERATOR SYSTEM                                                   │  │
│  │                             411                                   │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ RECORD, IN THE PERMISSIONED DISTRIBUTED LEDGER, A THIRD ONE OF THE      │
│ THIRD SET OF RECORDS THAT INCLUDES A FIRST CORE NETWORK                 │
│ SPECIFICATION FOR A FIRST NETWORK SLICE TEMPLATE OF THE FIRST           │
│ NETWORK OPERATOR SYSTEM                                                 │
│                                  404                                    │
│  ┌───────────────────────────────────────────────────────────────────┐  │
│  │ WHERE THE FIRST CORE NETWORK SPECIFICATION INCLUDES A             │  │
│  │ DESCRIPTION OF A FIRST SET OF SERVICE FUNCTIONS AND FIRST         │  │
│  │ PHYSICAL RESOURCES FOR INSTANTIATION OF THE FIRST SET OF          │  │
│  │ SERVICE FUNCTIONS FOR THE FIRST NETWORK OPERATOR SYSTEM           │  │
│  │                             412                                   │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ RECORD, IN THE PERMISSIONED DISTRIBUTED LEDGER, A FOURTH RECORD OF      │
│ THE SECOND SET OF RECORDS THAT INCLUDES AN UPDATED FIRST ACCESS         │
│ NETWORK SPECIFICATION FOR THE ONE OR MORE NETWORK SLICE TEMPLATES       │
│ OF THE FIRST NETWORK OPERATOR SYSTEM                                    │
│                                  405                                    │
└─────────────────────────────────────────────────────────────────────────┘
                                    │
                                    ▼
┌─────────────────────────────────────────────────────────────────────────┐
│ RECORD, IN THE PERMISSIONED DISTRIBUTED LEDGER, A FIFTH ONE OF THE      │
│ THIRD SET OF RECORDS THAT INCLUDES A SECOND CORE NETWORK                │
│ SPECIFICATION FOR A SECOND NETWORK SLICE TEMPLATE OF THE FIRST          │
│ NETWORK OPERATOR SYSTEM                                                 │
│                                  406                                    │
└─────────────────────────────────────────────────────────────────────────┘
```

Fig. 4A

NETWORK SLICE INSTANCE PROVISIONING BASED ON A PERMISSIONED DISTRIBUTED LEDGER

CROSS-REFERENCE TO RELATED APPLICATIONS

This application is a National stage of International Application No. PCT/EP2020/050028, filed Jan. 2, 2020, which is hereby incorporated by reference.

TECHNICAL FIELD

The present disclosure relates to the field of communication networks; and more specifically, to network slice instance provisioning based on a permissioned distributed ledger network for deployment of a service for a customer.

BACKGROUND

To support multiple types of communication services over a same network, the concept of network slicing has been introduced. A network slice or network slice template (NST) is a description of specific network capabilities and network characteristics that provide a logical network. A network slice instance (NSI) of an NST is a set of network function instances and the physical resources (e.g. compute, storage and networking resources) which are used for the deployment of the network slice. Thus, a network slice instance is a logical network that is provisioned with a set of isolated virtual resources on a shared physical network infrastructure. Customers of a network service provider, which can range from private individuals, small and medium enterprises (SMEs) to global multinationals, may request and eventually access one or more network slice instances. Between request and access, there is a preparation and deployment phase, wherein the Network Operator (NOP) designs an NST, onboards and finally creates the NSI based on the template.

As connectivity service offerings expand and devices become increasingly connected, customers request network services that transcend geographical boundaries such as countries or continents. Each customer of network services may request to deploy a network service globally using the same requirements distributed over multiple locations. For example, a vehicle manufacturer may want global connectivity for their vehicles, using the same low latency, high throughput Quality of Service (QoS). Similarly, a camera manufacturer may want to use a soft-subscriber identity module (SIM) on its products sold worldwide (e.g., for uploading pictures to social media, cloud storage services, etc.). In another scenario, an enterprise customer may want the deployment of a network service limited to specific geographical regions with data generated in a region not to be able to be transmitted to other regions—this is also known as "geofencing."

Several approaches have been introduced to provision network slices across multiple locations. Multi-domain slice orchestration looks into deploying NSIs across different vendors, where every vendor "owns" part of the resources needed for end-to-end deployment of the NSI (e.g. transport, compute-store, radio). Further, the 3rd Generation Partnership Project (3GPP) TS 28.530 specification describes the network slice as a service concept, where a communication service can be offered to a customer, and the customer in turn may repackage the network slice and offer it to its own customer(s).

Several systems are proposed for NSI provisioning in a single or multiple NOPs. In multi-vendor type of NSI provisioning, this may mean that a network slice can be instantiated across multiple locations according to the location of the vendors of the network slice. However, in all existing NSI provisioning systems, there is an implicit assumption that one NSI matches one communications service rendered to the customer. Further existing NSI provisional systems, do not provide the option of deploying multiple NSIs, i.e. multiple core networks in different locations for the same communications service. In addition, another aspect not covered by existing NSI provisioning system is the "green" aspect of NSI deployment and operation. Network infrastructure in radio access or core network is powered from different energy sources that may be of "clean" origin (e.g., renewables such as solar and wind) or from fossil fuels (e.g., from coal). Existing NSI provisioning system provide methods that refer that "mapping of resources" need to be made on infrastructure, without explicit mention of how this is to be implemented, nor do they mention the green separation.

Practical applications show that in many cases, there exists a need to provide multiple network slices (i.e. isolated networks) for a communications service. For example, when a communication service provided to a customer needs to cover multiple administrative domains, where different policy rules apply (e.g., in multiple countries) and/or provide multiple Quality of Service (QoS) (e.g., low latency and/or guaranteed bit rate) across multiple geographical locations. Several types of applications may need different ways for handling data traffic (e.g., different ways for throttling, prioritizing, and managing data traffic) across different geographical areas where the communication service is deployed. Additionally, multiple applications may need different mobile subscriber functionality (blacklisting and whitelisting, billing, etc.) for different geographical areas where the service is deployed. The need for these different types of requirements causes a need for the ability to provision multiple NSIs to enable a single communication service.

SUMMARY

An object of embodiments herein is to enable network slice instance provisioning based on a permissioned distributed ledger network. A system and method for provisioning multiple NSIs in multiple locations for one communications service are described. The embodiments herein present a distributed ledger network, which keeps a distributed ledger for storing multiple NSTs that are available to customers and for enabling the customer systems to select NSTs from the distributed ledger to be instantiated as NSIs for provisioning a service.

One general aspect includes a method of deployment of a first service for a first customer, the method including: determining, from a permissioned distributed ledger that is distributed between network operator systems of one or more network operators and customer systems, NSTs that include respective descriptions of network characteristics that provide respective logical networks; selecting based on a service description of the first service a subset of the NSTs and a corresponding subset of the network operator systems for deployment of the first service; and requesting instantiation of the subset of the NSTs on the corresponding subset of network operator systems as a subset of network slice instances to form the first service deployed for the first customer.

One general aspect includes a customer system for deployment of a first service for a first customer, the customer system including: one or more processors; and a computer readable storage medium storing a set of computer readable instructions that when executed by the one or more processors cause the customer system to perform operations including: determining, from a permissioned distributed ledger that is distributed between network operator systems of one or more network operators and customer systems, NSTs that include respective descriptions of network characteristics that provide respective logical networks; selecting based on a service description of the first service a subset of the NSTs and a corresponding subset of the network operator systems for deployment of the first service; requesting instantiation of the subset of the NSTs on the corresponding subset of network operator systems as a subset of network slice instances to form the first service deployed for the first customer.

One general aspect includes a method of network slice instances provisioning, the method including: recording, in a permissioned distributed ledger that is distributed between network operator systems of one or more network operators and customer systems, a first record that includes a first identifier of a first network operator and a first link to a second set of records and a second link to a third set of records; recording, in the permissioned distributed ledger, a second one of the second set of records that includes a first access network specification for one or more NSTs of the first network operator system; and recording, in the permissioned distributed ledger, a third one of the third set of records that includes a first core network specification for a first NST of the first network operator system.

One general aspect includes a network operator system including: one or more processors, and a computer readable storage medium storing a set of computer readable instructions that when executed by the one or more processors cause the network operator system to perform operations including: recording, in a permissioned distributed ledger that is distributed between network operator systems of one or more network operators and customer systems, a first record that includes a first identifier of a first network operator and a first link to a second set of records and a second link to a third set of records; recording, in the permissioned distributed ledger, a second one of the second set of records that includes a first access network specification for one or more NSTs of the first network operator system; recording, in the permissioned distributed ledger, a third one of the third set of records that includes a first core network specification for a first NST of the first network operator system.

BRIEF DESCRIPTION OF THE DRAWINGS

The present disclosure may best be understood by referring to the following description and accompanying drawings that are used to illustrate embodiments of the present disclosure. In the drawings:

FIG. 2B illustrates a block diagram of exemplary operations that can be performed for deploying a service, in accordance with some embodiments.

FIG. 4A illustrates a flow diagram of exemplary operations that can be performed for recording NSTs, in accordance with some embodiments.

DETAILED DESCRIPTION

Figure 1:
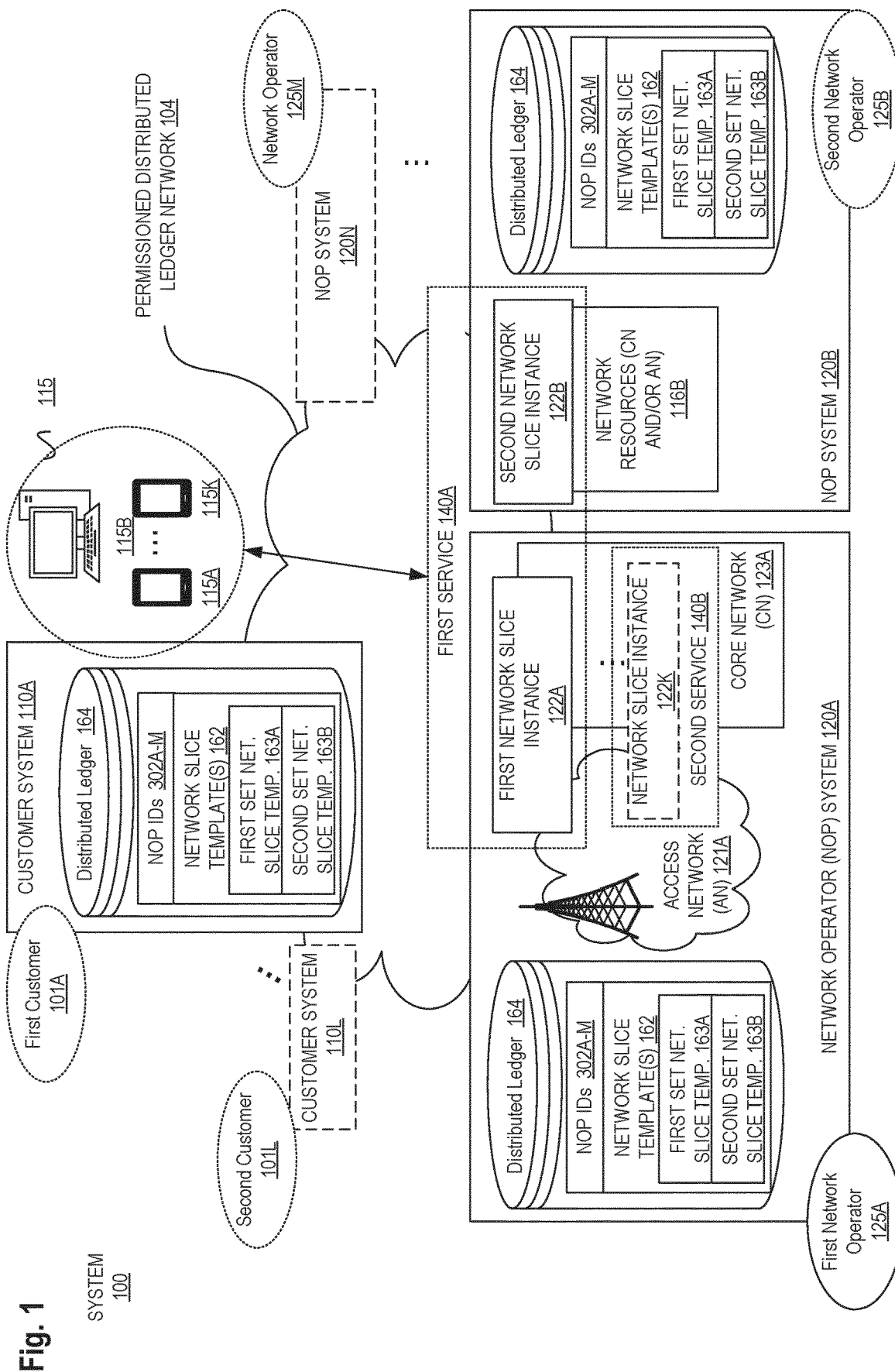
FIG. 1 illustrates a block diagram of an exemplary permissioned DL network for deployment of services for customers, in accordance with some embodiments.

The following description describes methods and apparatus for network slice instance provisioning based on a permissioned distributed ledger network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the embodiments may be practiced without such specific details. In other instances, control structures, gate level circuits and full software instruction sequences have not been shown in detail in order not to obscure the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and system for deployment of services for customers are described. The embodiments described herein disclose a system and method for selection and instantiation of multiple NSIs in multiple locations for a single service. The system operates on top of distributed ledger network. The distributed ledger network enables the storage of records of NSTs in an immutable distributed ledger. The records may further include an energy index for the network resources of the NST. In some embodiments, the distributed ledger further records that include evaluation information. In one embodiment, NSTs are determined, from a permissioned distributed ledger that is distributed between network operator systems of one or more network operators and customer systems. The NSTs include respective descriptions of network characteristics that provide respective logical networks. A subset of the NSTs, and a corresponding subset of the network operator systems are selected based on a service description of the first service for deployment of the first service. Instantiation of the subset of the NSTs is requested on the corresponding subset of network operator systems as a subset of network slice instances to form the first service deployed for the first customer.

The methods and apparatuses described herein present several advantages with respect to existing network slice provisioning systems. The methods and systems described herein enable deployment of multiple NSIs across multiple administrative domains for a single service. For example, the embodiments described herein enable two or more network operators to instantiate two or more NSTs to deploy a single service for a customer. In anther example, a single network operator may instantiate two or more NSTs on different network operator systems, which can be located at two different locations, for deployment of a single service for a customer. Other examples can be enabled by the present embodiments.

Further, the methods and systems described herein allow to avoid the requirement of manual network slice configuration and selection in different locations by enabling a customer to simultaneously select one or multiple NSTs (NSTs) to be instantiated in different locations by accessing the permissioned distributed database. Some of the methods and systems described herein may allow NOPs to exchange NSTs and charge for them, consequently opening new streams of revenue for NOPs. Some embodiments described herein promote sustainable growth of communication services by encouraging efficient use of network infrastructure powered from renewable, clean energy sources instead of fossil-based power sources by making use of an energy index stored for each NST in the distributed ledger.

FIG. 1 illustrates a block diagram of an exemplary system 100 for deployment of services for customers, in accordance with some embodiments. The system 100 includes a permissioned DL network 104, customer systems 110A, and network operator systems 120A-N.

The permissioned DL network 104 includes a set of DL nodes (not illustrated) that are included in each one of the customer systems 110A-L and the set of network operator systems 120A-N that allow the customer systems 110A-L and the NOP systems 120A-N to participate in the permissioned DL network 104.

In the following description some examples will be described for a particular type of DL networks, namely the blockchain networks. However, the embodiments described herein generally apply to other types of DL networks, which will not necessarily be named herein.

Distributed ledger technology (DLT) systems are platforms used for building, running, and deploying a decentralized, distributed ledger (DL) network. In a DL network a digital ledger or distributed ledger permanently records digital records of transactions that occur between two participants. The records cannot be altered retroactively without the alteration of all subsequent transactions in the distributed ledger and without consensus from other nodes in the network. This allows the participants and/or other entities to verify and audit transactions inexpensively and securely. A distributed ledger is maintained without a central authority or central implementation. For example, the distributed ledger can be a blockchain that includes blocks secured and linked to one another using cryptographic mechanisms.

Generally DL networks may be public (which can also be referred to as permissionless) or private (which can also be referred to as permissioned). Public DL networks are available to anyone who wants to join and use the network. In this type of DL network, anyone is allowed to read, write, or join the public DL network. The distributed ledger (e.g., a blockchain) is decentralized meaning no entity has control over the DL network, ensuring the data can't be changed once validated on the DL. In public DL networks, anyone, anywhere, can use the DL network to input transactions and data. In contrast, while private DL networks can be similar to public DL networks in certain aspects, they have access controls that restrict those that can join the network. Private DL networks have one or multiple entities that control the network. Private DL networks are generally preferred to public DL networks for use cases with interactions between a limited number of participants. In the description herein a private DL network and private distributed ledger will be referred to as a permissioned DL network and a permissioned distributed ledger respectively.

Multiple participants (e.g., organizations, enterprises, individuals, etc.) can set up a private DL network to protect the privacy and security of their data. Typically, participation in a private DL network is initiated through an invitation. The participant in the private DL network can be validated by a node that starts the DL network (which can be referred to as a network starter) or by a set of rules. In addition to restricting access to participants, a private DL network can also restrict participants' activities such that some transactions can only be carried out by some participants and not by other participants consequently creating an additional layer of privacy. Participation authorization can be set up by a single participant of the DL network, a regulatory authority, or a consortium of participants.

The DL network 104 is a permissioned DL network that have customer systems 110A-L and NOP systems 120A-N as participants. The various components of the system 100 communicate through a physical network (supported by wired, wireless, or a combination of wired and wireless networking technology) that is not illustrated. The system 100 enables customers of network services and operators that operate and/or own the network infrastructures (e.g., access network infrastructure and/or core network infrastructure) to use a distributed ledger 164 for storing NSTs. In some embodiments, the distributed ledger 164 may further store feedback on usage of these NSTs by the customers. The NSTs are available to be accessed by the customer systems 110A-L for defining a service and instantiating the service based on instantiation of the NSTs into NSIs.

A participant in the DL network 104 is an entity that can participate and contribute to transactions with other participants in the distributed ledger. The participant can be a person, or an organization. The participant is typically associated with a DL node (not illustrated) that is used to access the DL network 104. Accessing the DL network may include reading from the distributed ledger 164 or additionally/alternatively writing to the distributed ledger. In addition, a participant can own one or more additional nodes that can be part of the DL network. Thus, a node of a participant can be a DL node, or a simple node that is not part of the DL network 104. A participant can also be referred to as an organization, or an entity in the DL network 104. In some embodiments, a participant can be a customer from the customers 101A-L or a network operator from the network operators 125A-M. In some embodiments, these two types of participants are associated with different permission levels in the distributed ledger. In some embodiments, the customers 101A-L may have permission to modify a first type of records and have viewing permission to a second type of records; while the NOPs 125A-M may have permission to modify the second type of records and have viewing permission only to the first type of records.

Each of the DL nodes is an electronic device that allows a participant to access and/or update records stored in the distributed ledger 164. In some embodiments, the update of the distributed ledger records can be done by way of adding one or more transactions to the private distributed ledger 164 of the DL network 104. A DL node is a node that is operative to perform some, or all operations related to updating and maintaining the distributed ledger. For example, a DL node can be a full node that stores the entire distributed ledger 164. Alternatively, the DL node can be a light node, which may include only a partial list of the digital ledger. The DL node may further be operative to receive records from nodes of participants, evaluate the transactions, and validates them to be added to the distributed ledger based on a consensus algorithm (such as Proof Of Work (PoW), Proof of Stake (PoS), or other). A DL node can be referred to as a peer node or peer. In some embodiments, the DL node may include a copy of the distributed ledger 164. For example, each one of the distributed ledgers 164 of the NOP systems 120A-N and the customer systems 110A may be part of a DL node.

Each one of the NOP systems 120A-N include a set of electronic devices (e.g., access networks including radio base station, data centers, servers, computers, and/or other electronic devices) that are operated by a network operator from the network operators 125A-M. In some embodiments, each one of the NOP systems 120A-N is operated by a respective one of the NOPs 125A-M. In other embodiments, two or more of the NOP systems 120A-N can be operated by the same NOP from the NOPs 125A-M. A NOP can be a standard public landline mobile network (PLMN) operator offering radio access to mobile devices. In some embodiments, the NOP may offer radio access services to customers as well as core network services that rely on core network resources (e.g., data centers, servers, etc.). In other embodiments, the NOP may offer either one of the access services (radio access resources) or the core network services. The NOP use a DL node of the NOP systems to record the NSTs that can be instantiated on the NOP system in the distributed ledger 164. Further each of the NOP systems 120A includes a copy of the distributed ledger 164, which stores all NSTs provided by the participants in the DL network 104. For example, the NOP systems 120A-N may include a first NOP system 120A and a second NOP system 120B. The first and second NOP system may be operated by the same NOP 125A or alternatively by two different NOPs 125A and 125B. In some embodiments, the multiple NOP systems 120A-N can be located in different geographical locations. For example, the first NOP system 120A can be located in a first country, while the second NOP system 120B can be located in a second country.

In some embodiments, the NOP system 120A includes an access network 121A and a core network 123A. The NOP system 120A may further include a distributed ledger 164 as part of a DL node. The distributed ledger 164 includes the identifiers of the NOPs 302A-M and a set of NSTs 162. For example, the NSTs 162 may include a first set of NSTs 163A that can be instantiated on the NOP system 120A and a second set of NSTs 163B that can be instantiated on the NOP system 120B. While the system 100 is illustrated as including a number of NOP systems 120A-N, different numbers of NOP systems can be included in a system without departing from the scope of the present embodiments.

In some embodiments, the NOP systems may record in the distributed ledger 164 a price associated with each one of the NSTs stored. The price may be used by other NOPs for evaluating whether to rent and or purchase the NSTs of another NOP. Thus, the recordation of the price for each one of the NSTs 162 in the distributed ledger 164 may allow NOPs to exchange NSTs and charge for them, consequently opening new streams of revenue for NOPs.

The system 100 further includes the customer systems 110A-L. Each one of the customer systems 110A-L is associated with a respective customer 101A-L. A customer from the customer 101A-L is an entity that requests a network service that can be fulfilled through instantiation of one or more NST on one or more of the NOP systems 120A-M. The customer can be a sole private subscriber, an enterprise (small, medium, or larger) which has a communication service description available. The customer uses a respective one of the customer systems 110A to access NSTs from the distributed ledger 164 that are available from the NOP systems 120A-N. The customer systems 110A-L are operative to select based on a service description of the first service 140A a subset of the network slice templates and a corresponding subset of the network operator systems (120A-B) for deployment of the first service. The customer systems 110A-L are then operative to request instantiation of the subset of the network slice templates on the corresponding subset of network operator systems (e.g., 120A-B) as a subset of network slice instances to form the first service 140A deployed for the first customer 101A. For example, the first service may provide wired and/or wireless network communication for the user equipments (UEs) 115 (115A-K). Each one of the user equipments 115 is an electronic device that can be used by one or more subscribers of the first service 140A. In some embodiments, the customer 110A or another customer from the customers 110A-110L can be operative to access the distributed ledger 164 and select a different subset of NSTs from the NSTs 162 for instantiating a set of NSI to form a second service (e.g., service 140B). The second service 140B may be instantiated based on NSTs that are different than the NSTs for the first service 140A. In other embodiments, the second service 140B may be instantiated based on a subset of NSTs that are shared with the NSTs of the first service 140A.

The use of a DL network 104 to record and provision NST deployment allow to take advantage of immutability, replicability and consensus properties, which are greatly advantageous in scenarios where multiple entities contributing to part of the overall service are present (e.g., cross-NOP scenario, distributed geographical locations of NOP systems, etc.). The immutability property guarantees that the records storing the NSTs remain unchanged, guaranteeing transparency of NST availability for the customers. The replicability principle ensures that all entities participating in the DL network 104 have the same copy of the data. The consensus property ensures that in order for new NST and/or customer feedback to be written, all participating entities need to agree.

The methods and apparatuses described herein present several advantages with respect to existing network slice provisioning systems. The methods and systems described herein enable deployment of multiple NSIs across multiple administrative domains for a single service. For example, the embodiments described herein enable two or more network operators to instantiate two or more NSTs to deploy a single service for a customer. In another example, a single network operator may instantiate two or more NSTs on different network operator systems, which can be located at two different locations, for deployment of a single service for a customer. Other examples can be enabled by the present embodiments.

Further, the methods and systems described herein allow to avoid the requirement of manual network slice configuration and selection in different locations by enabling a customer to simultaneously select one or multiple NSTs to be instantiated in different locations by accessing the permissioned distributed ledger 164. Some of the methods and systems described herein may allow NOPs to exchange NSTs and charge for them, consequently opening new streams of revenue for NOPs. Some embodiments described herein promote sustainable growth of communication services by encouraging efficient use of network infrastructure powered from renewable, clean energy sources instead of fossil-based power sources by making use of an energy index stored for each NST in the distributed ledger.

The operations in the block diagrams of FIGS. 2A-B and the flow diagrams of FIGS. 4A-B will be described with reference to the exemplary embodiments of FIGS. 1 and 3A-3B. However, it should be understood that the operations of the flow diagrams and the block diagrams of FIGS. 2A-B and FIGS. 4A-B can be performed by embodiments of the invention other than those discussed with reference to FIG. 1 or 3A-B, and the embodiments of the invention discussed with reference to FIGS. 2A-B and FIGS. 4A-B can perform operations different than those discussed with reference to the diagrams of FIGS. 2A-B or FIGS. 4A-B.

Figure 3A:
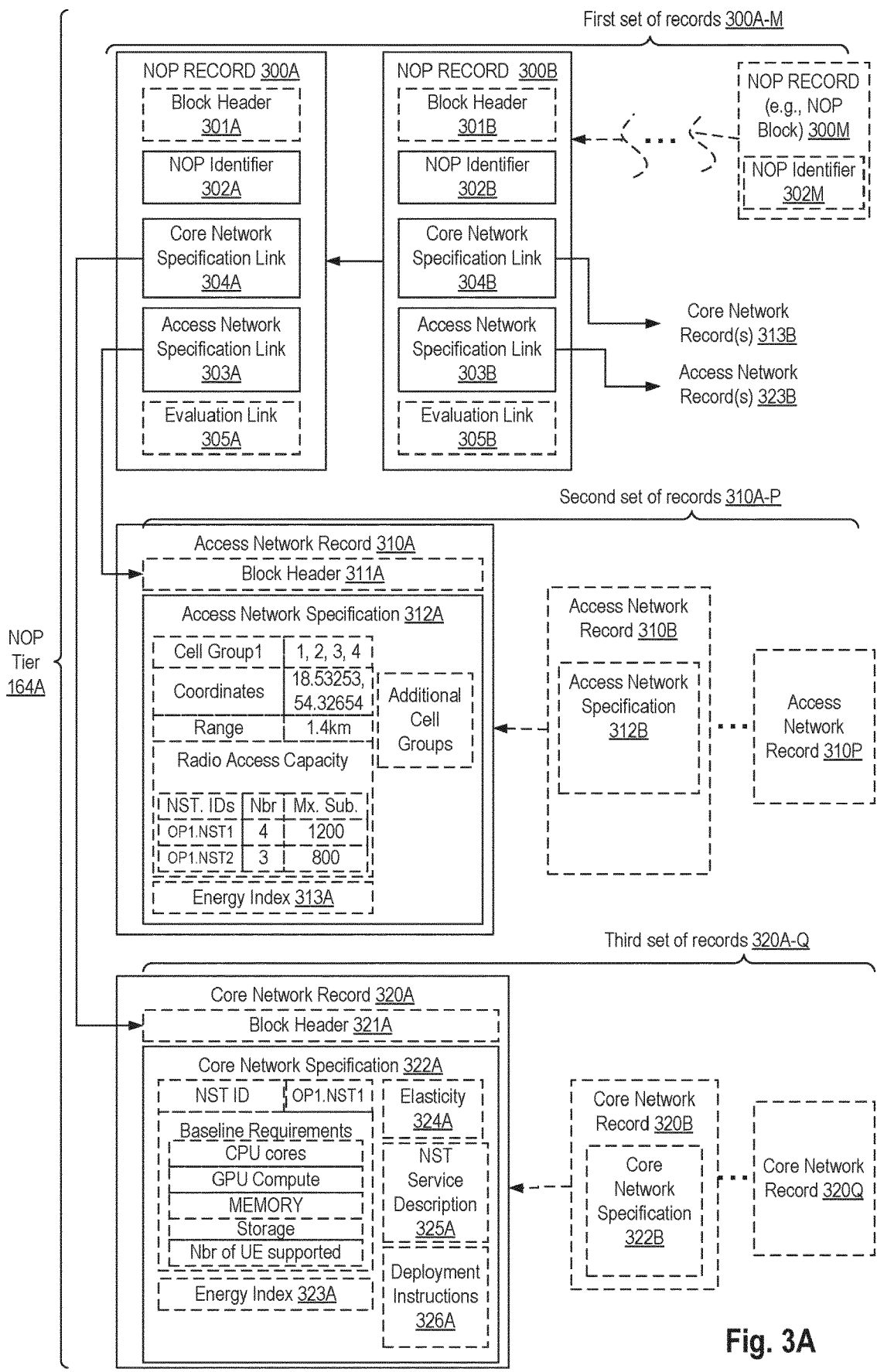
FIG. 3A illustrates a block diagram of an exemplary network operator tier of records stored in a distributed ledger, in accordance with some embodiments.
Figure 3B:
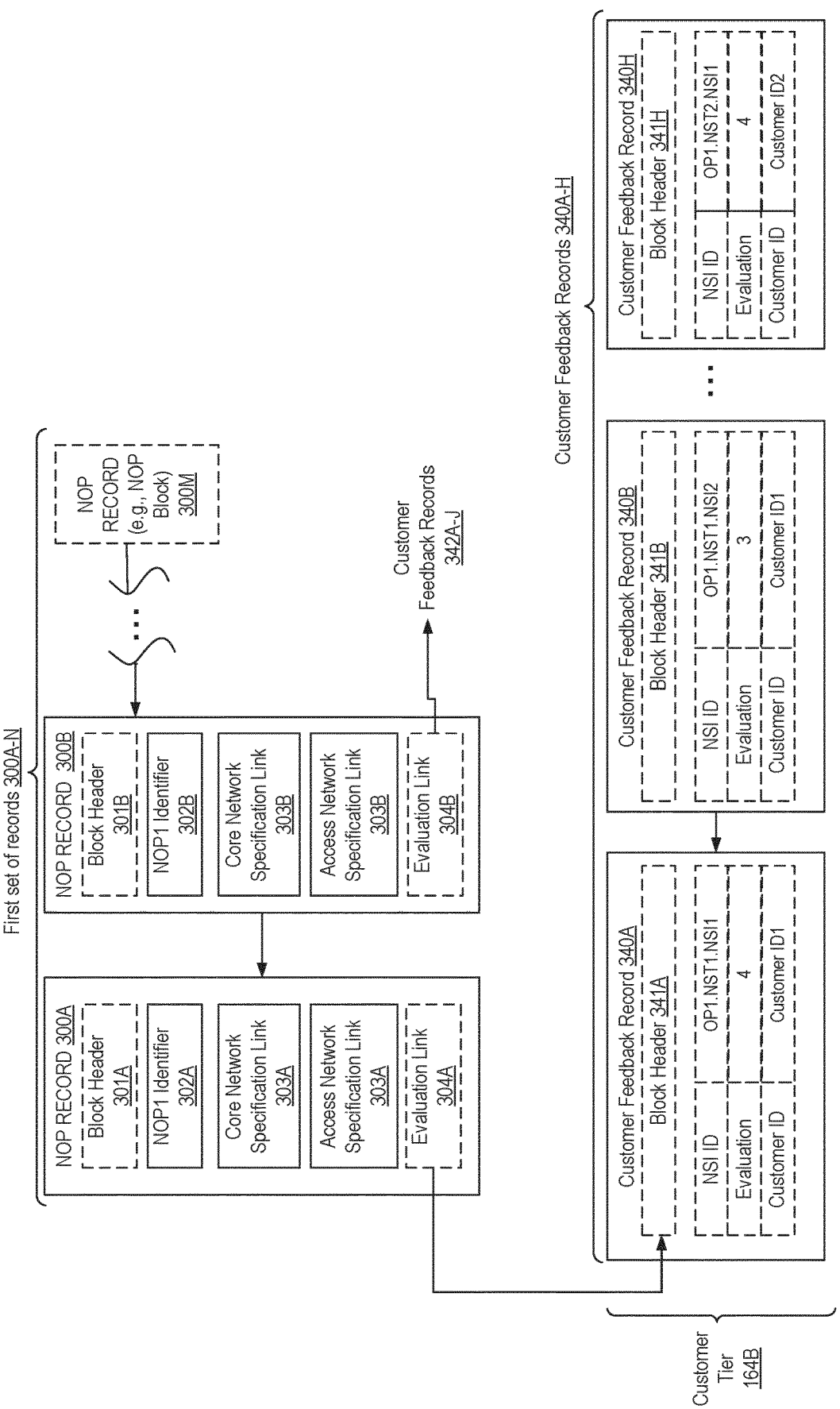
FIG. 3B illustrates a block diagram of an exemplary customer tier of records stored in a distributed ledger, in accordance with some embodiments.

FIGS. 3A-B shows additional details of the structure of the distributed ledger 164, according to some embodiments. In some embodiments, the distributed ledger 164 may include an NOP tier of records 164A and a customer tier of records 164B. As discussed above, two different types of entities participate in the DL network 104, NOPs and customers. These two types of participants are associated with different permission levels in the distributed ledger represented with the type of tier of records that they can access. The NOP tier of records 164A includes the first set of records 300A-M, the second set of records 310A-P and the third set of records 320A-Q. The NOP tier of records 164A is a type of records to which the NOPs 125A-M have both "read" and "write" access, but customers only have "read" access. Thus, the NOPs 125A-M are allowed to add new records to the NOP tier of records and read these records from the distributed ledger 164. In contrast, the customers are not allowed to add records to the NOP tier of records but instead can access these records for reading their content. The customer tier of records 164B includes the customer feedback records 340A-H. The customer tier of records is a type of records in the distributed ledger 164B that the NOPs have "read" access only and the customers have "read" and "write" access. Thus, the customers are allowed to add new records to the customer tier of records 164B and read these records from the distributed ledger 164. In contrast, the NOPs are not allowed to add records to the customer tier of records but instead can access these records for reading their content. In some embodiments, the distributed ledger 164 can be a blockchain. As shown, the records in the distributed ledger 164 can include multiple chains of records (first set of records 300A-N, second set of records 310A-P, third set of records 320A-Q, and the customer feedback records 340A-H) in the form of blocks. Each block is linked to the previous block in its respective chain, with each block containing a cryptographic hash of the previous block. While some embodiments will be described with the records being blocks in a blockchain, this implementation is presented for illustrative purposes and there can exist other types of implementations that exhibit the characteristics of immutability, replicability and consensus, and which can be used for storing the records described herein.

Figure 2A:
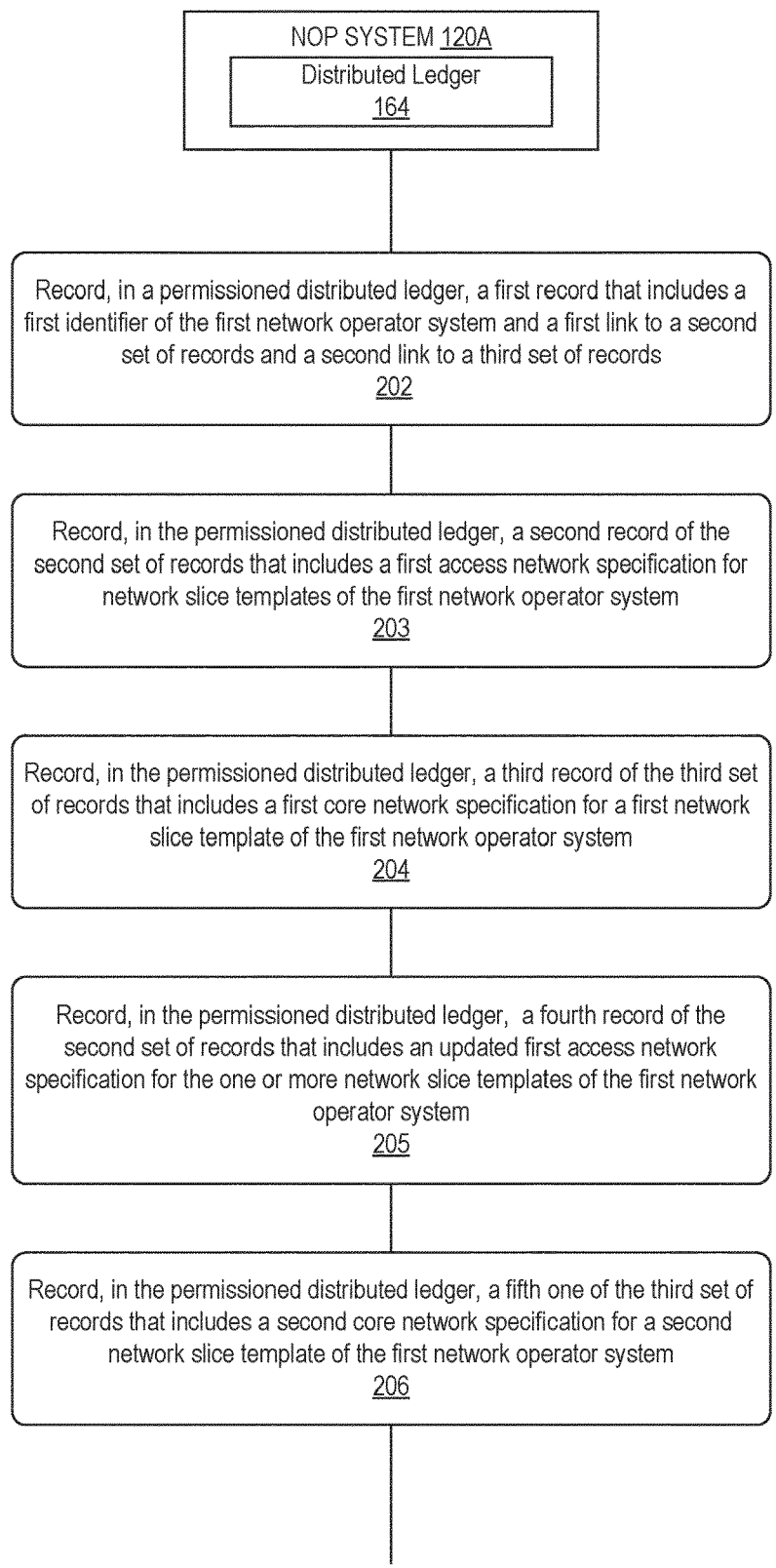
FIG. 2A illustrates a block diagram of exemplary operations that can be performed for recording NSTs, in accordance with some embodiments.

FIG. 2A illustrates a block diagram of exemplary operations that can be performed for recording NSTs, in accordance with some embodiments. The operations herein will be described for a first NOP system 120A. However, one of ordinary skill in the art would understand that the system 100 may include more than one NOP system, e.g., NOP systems 120B-N, and records can be stored in the distributed ledger 164 for each one of these systems. In some embodiments, the operations performed by the NOP system 120A can be performed by the DL node included in the NOP system 120A. In other embodiments, the operations can be performed by a DL node that is implemented remotely from the NOP system 120A. For example, when the NOP system 120A is part of a set of NOP systems that belong or are managed by the same network operator, the network operator may use a single DL node for recording slice template information in the distributed ledger for all of the systems. The embodiments herein will be described with respect to the NOP system 120A performing the operations 202-206, however this should be considered as exemplary only and not limitative, other elements can be used by a network operator for recording NSTs in the distributed ledger 164. In the following description recording data in the distributed ledger 164 of the DL network 104 indicates that the data is submitted to be stored in the distributed ledger and a successful consensus mechanism is performed between participants of the distributed ledger network. When the distributed ledger is a permissioned ledger, the consensus mechanism may include the verification that a participant submitting the data to be recorded is authorized to write in the distributed ledger. For example, recording records in the NOP tier of records 164A may include a verification that the entity requesting the recordation of the record is a participant in the DL network 104 and is of network operator type.

At operation 202, the NOP system 120A records, in the permissioned distributed ledger 164, a first record 300A that includes a first identifier 302A of the first network operator and a first link 303A to a second set of records 310A-P and a second link 304A to a third set of records 320A-Q. The first record 300A is used by the NOP system 120A to record the presence of the first network operator 125A as a participant in the permissioned DL network 104. In some embodiments, the NOP system 120A is used by the first network operator 125A to create the first record 300A during bootstrapping of the system 100 (i.e., system startup). In other embodiments, the network operator 125A can create the first record 300A at any point during the lifetime of the system 100. The network operator 125A can be added at the time the network operator 125A joins the network 104 as a participant. Each one of the records 300A-N is unique to every network operator 125A-M and includes a respective identifier 302A-M of the respective network operator. For example, the first record 300A includes the first identifier 302A that uniquely identifies the network operator 125A. In some embodiments, the identifier 302A can be a Home Network Identifier (HNI) of the network operator 125A. The record 300A includes a first link 303A to the second set of records 310A-P. The first link 303A is an access network specification link. The access network specification link 303A can be a pointer to the second set of records 310A-P. The first record 300A further includes the second link 304A to the third set of records 320A-Q. The second link 304A is a core network specification link. The core network specification link 304A can be a pointer to the third set of records 320A-Q. In some embodiments, the second set of records 310A-P may include one or more records that are associated with the first record 300A. In some embodiments, the third set of records 320A-Q may include one or more records that are associated with the first record 300A. While the second set of records 310A-P and the third set of records 320A-Q are illustrated for the first record 300A, each one of the NOP records 300B-M is also associated with respective access network records and core network records. For example, record 300B may include the link 303B that links the record 300B to one or more access network records 323B and may include the link 304B that links the record 300B to one or more core network records 313B.

The first record 300A may also include an evaluation link 305A. The evaluation link 305A is associated with a customer feedback record 340A (of FIG. 3B) in the customer tier 164B. In other embodiments, the system is not operative to record customer feedback and the customer feedback records 340A-H are not included in the distributed ledger 164. In these embodiments, the first records 300A-M do not include the evaluation links 304A-M.

At operation 203, the NOP system 120A records, in the permissioned distributed ledger 164, a second record 310A of the second set of records 310A-P that includes a first access network specification 312A for one or more NSTs of the first network operator system 120A. The first access network specification 312A includes a description of the access network of the corresponding network operator system 120A. In some embodiments, the second set of records 310A-P may include additional records 310B-P that indicate updates that occurred over time to the access network for the network operator system 120A.

In some embodiments, the first access network specification 312A may include an identification of one or more cells (e.g., cell group 1 including cells 1, 2, 3, and 4), their respective coordinates indicating their location, a range of the cells, and the available radio resources capacity for supporting network slice instances. For example, the radio access capacity is expressed in terms of possible NSIs of different NSTs that can be supported by a group of cells. A cell is the geographical area of coverage of a radio base station. The coordinates of the cells contain a set of geographical coordinates which indicate coverage of the cell group. For example, every set of coordinates (latitude, longitude) being an edge of the bounding box of coverage. In some embodiments, each access network specification 312A may include information related to one or multiple groups of cells.

In some embodiments, the access network specification 312A may include an energy index 313A. The energy index 313A indicates the type of the power source used by the access network for the first network operator system 120A. In a non-limiting example, the energy index 313A may indicate whether the power source is fixed (e.g. fossil fuel-based) or dynamic (i.e. from renewables—clean energy). The energy index 313A can be modeled on a scale from 0 to 1, where a value closer to 1 may indicate that there is more power production from renewable sources. For example, an index of 0.8 indicates that 80% of power is produced from renewables. In some embodiments, the energy index 313A may be indicative of the type of the power source used for all cell groups of an access network. Alternatively, the energy index 313A may be indicative of the type of power source used for a single cell group from multiple cell groups for the access network of the first network operator system 120A. When the second set of records 320A-Q includes multiple records, each record may include a respective access network specification.

At operation 204, the NOP system 120A records, in the permissioned distributed ledger 164, a third record 320A of the third set of records 320A-Q that includes a first core network specification 322A for a first NST of the first network operator system 120A. The core network specification 322A includes a description of service functions and physical resources for instantiation of the service functions for the corresponding network operator system 120A. In some embodiments, the third set of records 320A-Q may include one or multiple records. Each record accounts for a separate NST. Each record includes a description of the characteristics of the core network associated with the NST. This core network specification 322A that includes the description of the core network when combined with an associated access network specification, e.g., 312A, form a single NST. In some embodiments, two records from the third set of records 320A-Q may be associated/linked to a single record from the second set of records 310A-P. In some embodiments, the first access network record 310A is associated with two or more core network records 320A-Q defining respectively two or more NSTs. In other embodiments, each first access network specification 312A is associated with a single core network record 320A consequently defining a single NST. While the embodiments herein will be described with reference to the core network specification 322A, each one of the set of records 320A-Q may include a respective core network specification.

The core network specification 322A may include an identification of the type of NST (NST ID: OP1.NST1), baseline requirements that include compute and storage resources requirements for the NST to run. The compute and storage resources requirements can be expressed in terms of CPU cores, Random Access Memory and Hard Disk Drive storage space required to support a set of mobile devices (also known as User Equipment—UEs). The core network specification 321A may also include an NST service description 325A. The NST service description contains information about the purpose of the NST. The format of the description may vary according to the implementation, for example semantic web technologies such as ontologies can be used, or simpler formats such as JSON-based formats can be used, etc. Similarly, the content of the description can be of different granularity. In some embodiments, the NST service description can include a categorization of the NST based on standard defined by a standardization group (e.g., 3GPP standardized communication service types (Ultra Reliable Low-Latency Communications—URLLC, enhanced Mobile Broadband—eMBB and massive machine type communications—mMTC)). Additionally or alternatively, the NST service description may also include an indication of the industry or the specific application (or both), that the NST is designed for (e.g., "automotive; autonomous driving" or "health; remote surgery"). In some embodiments, the core network specification 322A may further include an elasticity component 324A. In some embodiments, the core network specification 322A may include pricing information correlated to metrics such as number of supported mobile subscribers, lifetime of the network slice instance, etc. In some embodiments, the core network specification 322A may also include deployment instructions for the NST. The deployment instructions may be contained in a blueprint. The blueprint describes how the NST is to be deployed in the core network 123A of the first network operator system 120A and includes configuration information for the deployment. The deployment instructions describes configuration of the core network nodes to match the functionality described by the service description 325A.

At operation 205, the NOP system 120A records, in the permissioned distributed ledger 164, a fourth record 310B of the second set of records 310A-P that includes an updated first access network specification 312B for the one or more NSTs of the first network operator system 120A. The NOP system 120A may update the characteristics of its access network by recording a new record in the second set of records 310A-P. This update can be performed as a result of an increase of the access network capacity of the NOP system 120A or alternatively as a result of a reduction of the access network capacity of the NOP system 120A.

At operation 206, the NOP system 120A records, in the permissioned distributed ledger 164, a fifth record 320B of the third set of records 320A-Q that includes a second core network specification 322B for a second NST of the first network operator system. The second NST of the first network operator system 120A is different from the first NST of the first network operator system 120A. The first NST and the second NST are linked to the second one of the second set of records. The NOP system 120A may update the characteristics of its core network by recording a new record in the third set of records 320A-Q. This update can be performed as a result of an increase of the core network capacity of the NOP system 120A for a given NST (an increase in compute and/or storage resources dedicated for the NST). The update can be performed for adding a new type of NST supported by the NOP system 120A. Alternatively, the update can be performed for indicating a decrease in the compute and/or storage resources available for an NST. In some embodiments, the update can be performed for indicating a modification to a given NST (e.g., a software update, etc.).

The operations described herein can be performed by multiple NOPs for recording multiple NSTs in the distributed ledger 164. These NSTs are then available to one or more customers 110A-L to be accessed for selection and deployment of a service.

FIG. 2B illustrates a block diagram of exemplary operations that can be performed for deploying a service, in accordance with some embodiments. At operation 222, the customer system 110A creates a service description. The service description defines the first service that the customer 101A would like deployed for one or more subscribers. For example, the service description can include a location for the first service, one or more characteristics of the first service such as number of subscribers, whether the first service should include clean energy power source, an industry segment in which the customer 101A operates, etc. The service description may further include characteristics desired by the customer for the service, such as one or more of high availability, low latency, global connectivity, and/or high throughput, etc. In some embodiments, the service description can be information about the customer and the desired service presented in a form of metadata that can be used to facilitate selection of suitable NSTs to be deployed on one or more NOP systems 120A-N. For example, the metadata may include an identification of the industry segment the customer operates in, an identification of the countries the customer operates in, or their size (from small and medium enterprises, SMEs, to large multinationals). The service description may include an identifier of the customer 101A; an integer indicating the maximum number of subscribers for the service; and an energy index, which can be a Boolean value which if true indicates a preference to radio access, compute and store infrastructure that is powered by renewable ("clean") power sources rather than fixed ("dirty") power sources. The service description can be captured in free text, such as a JSON format file.

At operation 224, the customer system 110A determines, from the permissioned distributed ledger 164, NSTs 162. The NSTs 162 include respective descriptions of network characteristics that provide respective logical networks. Each description of network characteristics of an NST includes an access network specification and/or a core network specification. In some embodiments where the NST includes access network resources, a description of network characteristics of the NST may include an access network specification only. In some embodiments where the NST includes core network resources, a description of network characteristics of the NST may include an access network specification only. In other embodiments, where the NST includes access and core network resources, the description of the network characteristics of the NST may include access and core network specifications. The access network specification includes a description of the access network of a corresponding network operator system that is to be used for instantiation of the NST. The core network specification includes a description of service functions and physical resources (e.g., compute, storage, and/or networking resources) for instantiation of the service functions for the corresponding network operator system that is to be used for instantiation of the NST.

The determination of the NSTs 162 from the distributed ledger 164 includes accessing one or more records in the distributed ledger to retrieve for each network operator 125A-M that is a participant in the DL network 104, the NSTs that are offered by the network operator and which can be implemented on the network operator systems 120A-N. In some embodiments, accessing the records in the distributed ledger 164 includes retrieving access network specifications and/or core network specifications associated with identifiers 302A-M of the network operators 125A-M. In some embodiments, accessing the records may include accessing records of the NOP tier 164A. The NOP tier 164A may include the first set of records 300A-M and each one of the first set of records 300A-M includes a respective one of identifiers 302A-M of the network operators 125A-M. Each one of the first set of records 300A-M may be linked to a second set of records 310A-P that includes access network specifications 312A-P for the NSTs 162, and each one of the first set of records 300A-M may be further linked to a third set of records 330A-Q that include core network specifications 322A-Q for the NSTs 162. In some embodiments, when an NST does not include access resources for a record from records 300A-M, this record may include only a link to the third set of records 330A-Q. Similarly, when the NST does not include core network resources for a record from records 300A-M, this record may include only a link to the second set of records 320A-P. In other embodiments, a record from the records 300A-M may include both links to the second set of records 310A-P and to the third set of records 320A-Q.

At operation 226, the customer system 110A selects based on the service description of the first service a subset of NSTs and a corresponding subset of the network operator systems 120A-N for deployment of the first service. In some embodiments, the selection of the subset of NSTs may include operations 226A and 226B. At operation 426A, the customer system 110A selects a first NST from the first set of NSTs 163A and the first network operator system 120A. At operation 426B, the customer system 110A selects a second NST from the second set of NSTs 163B and the second network operator system 120B.

While the embodiments herein are described with respect to the customer system 110A selecting two NSTs, one of ordinary skill in the art would understand that this is intended to be exemplary only and should not be considered a limitation of the present embodiments. In other exemplary embodiments, the customer system 110A may select one or any other number of NSTs from the set of NSTs 162 stored in the distributed ledger 164. The NSTs selected may belong and/or be operated by the same network operator, or alternatively by two or more network operators. For example, the first NST may be operated by the first network operator 125A and has a corresponding network operator system 120A on which it is to be instantiated to form the first network slice instance 122A; and the second NST may be operated by the second network operator 125B and has a corresponding network operator system 120B on which it is to be instantiated to form the second network slice instance 122B. In another example, the first and the second NST may be operated by the first network operator 125A and may have corresponding network operator systems 120A-B on which they are to be respectively instantiated to form the first network slice instance 122A and the second network slice instance 122B, when the first and the second network operator systems 120A-B are operated by/belong to the first network operator 125A. Thus, the NSTs selected based on the service description of the first service allow the customer to mix and match network resources (access and core network resources) offered by one or more network operators in one or multiple locations.

The selection of the subset of NSTs is performed based on the service description and based on the network characteristics of each NST retrieved from the distributed ledger 164. The customer system 110A may determine whether the access network specification and/or the core network specification of an NST satisfies the requirements set in the service description for the first service that is to be deployed. For a given NST, the customer system 110A determines whether the location of the access network defined in the access network specification, e.g., 312A, allows for sufficient coverage that meets the requirements indicated in the service description for the first service. In some embodiments, the customer system 110A may select the NST including the access network only when the capacity of the access network satisfies the requirements in the service description. In other embodiments, the customer system 110A may select the NST including the access network even when the capacity of the access network does not entirely satisfy the requirements of the service description. For example, the customer system 110A may determine that the location of the access network defined in access network specification 312A partially addresses the coverage requirements for the first service and may consequently select the NST that includes the access network specification 312A for instantiation in combination with one or more additional NSTs that provide the remaining access network capacity needed. The additional NSTs can be provided by the same or a different NOP than NOP 120A. In some embodiments, the selection of the NST can further be performed by verifying that the access network specification indicates a number of subscribers that is greater or equal than the number of subscribers that the first service intend to service.

The selection of the NSTs can further be performed based on the core network specification in comparison with the service description. The customer system 110A selects the NSTs that have core network specification, e.g., 322A, that is similar to the service description. In some embodiments, for each NST retrieved from the distributed ledger 164, the customer system 110A compares the service description of the first service with NST core network specification for similarity. The comparison is based on different method depending on how the information is stored in the distributed ledger 164. For example, a lexicographical matching or machine learning techniques (e.g., word-embedding based approaches, such as word2vec) can be used to find similarity between the service description of the first service and the core network specification(s). In some embodiments, the result of the comparison can be represented as a normalized value between 0 to 1, where 1 indicates a perfect match and 0 indicates that no match was found.

In some embodiments, the selection of the NSTs can be further performed based on the energy index associated with each one of the access network specification and the core network specification. In some embodiments, the energy index can be used to select one or more NSTs that provide a sustainable network infrastructure for the first service.

In some embodiments, the selection of the NSTs can further be performed based on the evaluation information for each network operator 125A-M. In some embodiments, the customer system 110A may select the NST associated with a network operator that has a higher evaluation information than other network operators when the multiple operators offer NSTs with similar characteristics that satisfy the service description.

In some embodiments, the selection of the NSTs from the NSTs can be performed based on pricing information stored in the records of the distributed ledger 164. In some embodiments, pricing information can be added to the records of the distributed ledger, first record 300A, record 310A and/or record 320A, indicating a price that the network operator 125A charges for deploying a respective NST. The pricing can be linked to the capacity of the access network and the number of UEs supported by the access network of the corresponding network slice network. Additionally or alternatively, network operators may set up different pricing models, e.g., per month or annual. The pricing information is taken into consideration when selecting the NSTs that are to be instantiated for forming the first service.

When the selection of the multiple NSTs and their corresponding NOP systems is completed, the operation move to operations 228. The customer system 110A is operative to transmit requests to instantiate the multiple NSTs on their corresponding NOP systems. For example, the customer system 110A is operative to perform operations 228A-B, when the first and the second NST are selected to be instantiated on the first and the second NOP systems 120A-B respectively for deployment of the first service.

At operation 228A the customer 110A requests instantiation of the first NST from the NOP system 120A. At operation 228B, the customer 110A requests instantiation of the second network slice template from the NOP system 120B. In some embodiments, the first and the second NOP system 120A-B can be operated by the same network operator 125A. In other embodiments, the first and the second NOP system 120A-B can be operated by two different network operators 125A-B.

At operation 230A, in response to receiving the request for instantiation of the NST each one of the NOP systems 120A-B instantiates the respective NSTs to obtain respective NSIs 122A-B. the respective NSIs 122A-B form the deployed first service. In some embodiments, one or more additional services (e.g., a second service) can be selected by the customer 110A or by another one of the customers 110A-L. The second service can be deployed by instantiation of one or more NSTs on the NOP systems 120A-N.

In some embodiments, the customer system 110A may further be operative to record in the distributed ledger 164 evaluation information for the network operator. In some embodiments, the customer system 110A may record (at operation 430) in customer feedback records 340A-H of the permissioned distributed ledger 164 the evaluation information. The customer feedback records 340A-H are included in the customer tier 164B of the distributed ledger 164. The evaluation information represents an evaluation of usage of a network slice instance for a network operator system by the first customer 101A. For example, the evaluation information is indicative of how successful deployment of an NSI is. In some embodiments, the records 340A-H can be written to the distributed ledger 164 after the NSI reaches the end of lifetime, or alternatively when enough time has elapsed since the deployment of the NSI. If a customer is satisfied with an NSI, they will generally provide positive feedback, if not they will provide negative feedback. In the illustrated embodiment of FIG. 3B, following the instantiation of the first network slice instance 122A on the first NOP system 120A and usage of this instance for a given period of time by the first customer, the customer system 110A may record in the distributed ledger 164, the record 340A.

Multiple factors can be considered for evaluation of the deployed NSIs. Several objectives can be considered for defining the evaluation information. For example network-level technical key performance indicators such as latency crossing a threshold, or available throughput lower than requested, packet loss and jitter, can be used. Alternatively or additionally, subjective factors can be considered for defining the evaluation information such as complains of users of a customer for poor service. A qualitative or quantitative scale can be used for service satisfaction rating and determination of the role every objective factor plays to the calculation of the evaluation information. The evaluation information can be represented as a value in a quantitative scale in a record as illustrated in FIG. 3B. FIG. 3B illustrates a block diagram of an exemplary customer tier of records stored in a distributed ledger, in accordance with some embodiments. In this exemplary embodiment, each record 340 includes an identifier of the NSI (e.g., OP1.NST1.NSI1), a customer identifier, and the evaluation information (e.g., 4 in record 340A). In the illustrated example, the evaluation information is a value in a quantitative scale that represents an evaluation of the NOP after the customer has used an NSI instantiated on a system of the NOP for a determined period of time.

FIG. 4A illustrates a flow diagram of exemplary operations that can be performed for recording NSTs, in accordance with some embodiments.

At operation 402, the NOP system 120A records, in the permissioned distributed ledger 164, a first record 300A that includes a first identifier 302A of the first network operator and a first link 303A to a second set of records 310A-P and a second link 304A to a third set of records 320A-Q. The first record 300A is used by the NOP system 120A to record the presence of the first network operator 125A as a participant in the permissioned DL network 104. In some embodiments, the NOP system 120A is used by the first network operator 125A to create the first record 300A during bootstrapping of the system 100 (i.e., system startup). In other embodiments, the network operator 125A can create the first record 300A at any point during the lifetime of the system 100. The network operator 125A can be added at the time the network operator 125A joins the network 104 as a participant. Each one of the records 300A-N is unique to every network operator 125A-M and includes a respective identifier 302A-M of the respective network operator. For example, the first record 300A includes the first identifier 302A that uniquely identifies the network operator 125A. In some embodiments, the identifier 302A can be a Home Network Identifier (HNI) of the network operator 125A. The record 300A includes a first link 303A to the second set of records 310A-P. The first link 303A is an access network specification link. The access network specification link 303A can be a pointer to the second set of records 310A-P. The first record 300A further includes the second link 304A to the third set of records 320A-Q. The second link 304A is a core network specification link. The core network specification link 304A can be a pointer to the third set of records 320A-Q. In some embodiments, the second set of records 310A-P may include one or more records that are associated with the first record 300A. In some embodiments, the third set of records 320A-Q may include one or more records that are associated with the first record 300A. While the second set of records 310A-P and the third set of records 320A-Q are illustrated for the first record 300A, each one of the NOP records 300B-M is also associated with respective access network records and core network records. For example, record 300B may include the link 303B that links the record 300B to one or more access network records 323B and may include the link 304B that links the record 300B to one or more core network records 313B.

The first record 300A may also include an evaluation link 305A. The evaluation link 305A is associated with a customer feedback record 340A (of FIG. 3B) in the customer tier 164B. In other embodiments, the system is not operative to record customer feedback and the customer feedback records 340A-H are not included in the distributed ledger 164. In these embodiments, the first records 300A-M do not include the evaluation links 304A-M.

At operation 403, the NOP system 120A records, in the permissioned distributed ledger 164, a second record 310A of the second set of records 310A-P that includes a first access network specification 312A for one or more NSTs of the first network operator system 120A. The first access network specification 312A includes (operation 411) a description of the access network of the corresponding network operator system 120A.

In some embodiments, the first access network specification 312A may include an identification of one or more cells (e.g., cell group 1 including cells 1, 2, 3, and 4), their respective coordinates indicating their location, a range of the cells, and the available radio resources capacity for supporting network slice instances. For example, the radio access capacity is expressed in terms of possible NSIs of different NSTs that can be supported by a group of cells. A cell is the geographical area of coverage of a radio base station. The coordinates of the cells contain a set of geographical coordinates which indicate coverage of the cell group. For example, every set of coordinates (latitude, longitude) being an edge of the bounding box of coverage. In some embodiments, each access network specification 312A may include information related to one or multiple groups of cells.

In some embodiments, the access network specification 312A may include an energy index 313A. The energy index 313A indicates the type of the power source used by the access network for the first network operator system 120A. In a non-limiting example, the energy index 313A may indicate whether the power source is fixed (e.g. fossil fuel-based) or dynamic (i.e. from renewables—clean energy). The energy index 313A can be modeled on a scale from 0 to 1, where a value closer to 1 may indicate that there is more power production from renewable sources. For example, an index of 0.8 indicates that 80% of power is produced from renewables. In some embodiments, the energy index 313A may be indicative of the type of the power source used for all cell groups of an access network. Alternatively, the energy index 313A may be indicative of the type of power source used for a single cell group from multiple cell groups for the access network of the first network operator system 120A. When the second set of records 320A-Q includes multiple records, each record may include a respective access network specification.

At operation 404, the NOP system 120A records, in the permissioned distributed ledger 164, a third record 320A of the third set of records 320A-Q that includes a first core network specification 322A for a first NST of the first network operator system 120A. The core network specification 322A includes a description of service functions and physical resources for instantiation of the service functions for the corresponding network operator system 120A. In some embodiments, the third set of records 320A-Q may include one or multiple records. Each record accounts for a separate NST. Each record includes a description of the characteristics of the core network associated with the NST. This core network specification 322A that includes the description of the core network when combined with an associated access network specification, e.g., 312A, form a single NST. In some embodiments, two records from the third set of records 320A-Q may be associated/linked to a single record from the second set of records 310A-P. In some embodiments, the first access network record 310A is associated with two or more core network records 320A-Q defining respectively two or more NSTs. In other embodiments, each first access network specification 312A is associated with a single core network record 320A consequently defining a single NST. While the embodiments herein will be described with reference to the core network specification 322A, each one of the set of records 320A-Q may include a respective core network specification.

The core network specification 322A may include an identification of the type of NST (NST ID: OP1.NST1), baseline requirements that include compute and storage resources requirements for the NST to run. The compute and storage resources requirements can be expressed in terms of CPU cores, Random Access Memory and Hard Disk Drive storage space required to support a set of mobile devices (also known as User Equipment—UEs). The core network specification 321A may also include an NST service description 325A. The NST service description contains information about the purpose of the NST. The format of the description may vary according to the implementation, for example semantic web technologies such as ontologies can be used, or simpler formats such as JSON-based formats can be used, etc. Similarly, the content of the description can be of different granularity. In some embodiments, the NST service description can include a categorization of the NST based on standard defined by a standardization group (e.g., 3GPP standardized communication service types (Ultra Reliable Low-Latency Communications—URLLC, enhanced Mobile Broadband—eMBB and massive machine type communications—mMTC)). Additionally or alternatively, the NST service description may also include an indication of the industry or the specific application (or both), that the NST is designed for (e.g., "automotive; autonomous driving" or "health; remote surgery"). In some embodiments, the core network specification 322A may further include an elasticity component 324A. In some embodiments, the core network specification 322A may include pricing information correlated to metrics such as number of supported mobile subscribers, lifetime of the network slice instance, etc. In some embodiments, the core network specification 322A may also include deployment instructions for the NST. The deployment instructions may be contained in a blueprint. The blueprint describes how the NST is to be deployed in the core network 123A of the first network operator system 120A and includes configuration information for the deployment. The deployment instructions describes configuration of the core network nodes to match the functionality described by the service description 325A.

In some embodiments, the NOP system 120A may record additional records 310B-P that indicate updates that occurred over time to the access network for the network operator system 120A. In these embodiment, the NOP system 120A may further perform operation 405. At operation 405, the NOP system 120A records, in the permissioned distributed ledger 164, a fourth record 310B of the second set of records 310A-P that includes an updated first access network specification 312B for the one or more NSTs of the first network operator system 120A. The NOP system 120A may update the characteristics of its access network by recording a new record in the second set of records 310A-P. This update can be performed as a result of an increase of the access network capacity of the NOP system 120A or alternatively as a result of a reduction of the access network capacity of the NOP system 120A. In some embodiments, the access network of a given NOP system, e.g., NOP system 120A, may not be updated and in this case, the second set of records may include a single record 310A and operation 405 may not be performed.

In some embodiments, the NOP system 120A may record additional records 320B-Q that indicate updates that occurred over time to the core network and/or add additional NSTs for the network operator system 120A. In these embodiment, the NOP system 120A may further perform operation 406. At operation 206, the NOP system 120A records, in the permissioned distributed ledger 164, a fifth record 320B of the third set of records 320A-Q that includes a second core network specification 322B for a second NST of the first network operator system. The second NST of the first network operator system 120A is different from the first NST of the first network operator system 120A. The first NST and the second NST are linked to the second one of the second set of records. The NOP system 120A may update the characteristics of its core network by recording a new record in the third set of records 320A-Q. This update can be performed as a result of an increase of the core network capacity of the NOP system 120A for a given NST (an increase in compute and/or storage resources dedicated for the NST). The update can be performed for adding a new type of NST supported by the NOP system 120A. Alternatively, the update can be performed for indicating a decrease in the compute and/or storage resources available for an NST. In some embodiments, the update can be performed for indicating a modification to a given NST (e.g., a software update, etc.).

The operations described herein can be performed by multiple NOPs for recording multiple NSTs in the distributed ledger 164. These NSTs are then available to one or more customers to be accessed for selection and deployment of a service.

Figure 4B:
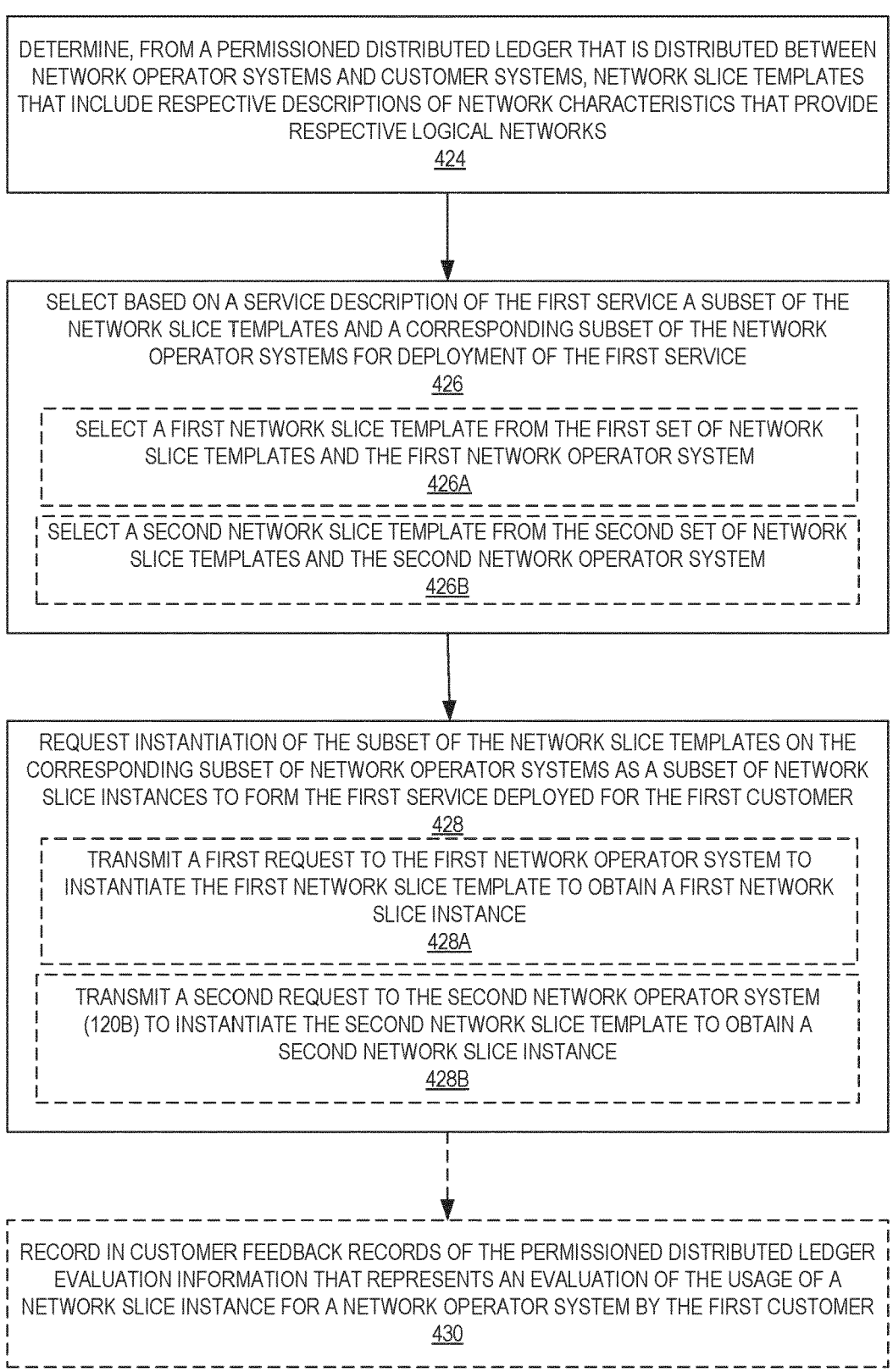
FIG. 4B illustrates a flow diagram of exemplary operations that can be performed for deploying a service, in accordance with some embodiments.

FIG. 4B illustrates a flow diagram of exemplary operations that can be performed for deploying a service, in accordance with some embodiments. In some embodiments, the operations of FIG. 4B can be performed by a DL node for the customer system 110A that provides access to the DL network 104 for the customer system 110A. In some embodiments, the operations of FIG. 4B are performed by the customer system 110A following the creation of a service description for a first service. In some embodiments, the customer system 110A may create one or more additional service descriptions for deployment of one or more additional network services (e.g., second service 140B). The customer system 110A creates a service description. The service description defines the first service that the customer 101A would like deployed for one or more subscribers. For example, the service description can include a location for the first service, one or more characteristics of the first service such as number of subscribers, whether the first service should include clean energy power source, an industry segment in which the customer 101A operates, etc. The service description may further include characteristics desired by the customer for the service, such as one or more of high availability, low latency, global connectivity, and/or high throughput, etc. In some embodiments, the service description can be information about the customer and the desired service presented in a form of metadata that can be used to facilitate selection of suitable NSTs to be deployed on one or more NOP systems 120A-N. For example, the metadata may include an identification of the industry segment the customer operates in, an identification of the countries the customer operates in, or their size (from small and medium enterprises, SMEs, to large multinationals). The service description may include an identifier of the customer 101A; an integer indicating the maximum number of subscribers for the service; and an energy index, which can be a Boolean value which if true indicates a preference to radio access, compute and store infrastructure that is powered by renewable ("clean") power sources rather than fixed ("dirty") power sources. The service description can be captured in free text, such as a JSON format file.

At operation 424, the customer system 110A determines, from the permissioned distributed ledger 164, NSTs 162. The NSTs 162 include respective descriptions of network characteristics that provide respective logical networks. Each description of network characteristics of an NST includes an access network specification and/or a core network specification. In some embodiments where the NST includes access network resources, a description of network characteristics of the NST may include an access network specification only. In some embodiments where the NST includes core network resources, a description of network characteristics of the NST may include an access network specification only. In other embodiments, where the NST includes access and core network resources, the description of the network characteristics of the NST may include access and core network specifications. The access network specification includes a description of the access network of a corresponding network operator system that is to be used for instantiation of the NST. The core network specification includes a description of service functions and physical resources (e.g., compute, storage, and/or networking resources) for instantiation of the service functions for the corresponding network operator system that is to be used for instantiation of the NST.

The determination of the NSTs 162 from the distributed ledger 164 includes accessing one or more records in the distributed ledger to retrieve for each network operator 125A-M that is a participant in the DL network 104, the NSTs that are offered by the network operator and which can be implemented on the network operator systems 120A-N. In some embodiments, accessing the records in the distributed ledger 164 includes retrieving access network specifications and/or core network specifications associated with identifiers 302A-M of the network operators 125A-M. In some embodiments, accessing the records may include accessing records of the NOP tier 164A. The NOP tier 164A may include the first set of records 300A-M and each one of the first set of records 300A-M includes a respective one of identifiers 302A-M of the network operators 125A-M. Each one of the first set of records 300A-M may be linked to a second set of records 310A-P that includes access network specifications 312A-P for the NSTs 162, and each one of the first set of records 300A-M may be further linked to a third set of records 330A-Q that include core network specifications 322A-Q for the NSTs 162. In some embodiments, when an NST does not include access resources for a record from records 300A-M, this record may include only a link to the third set of records 330A-Q. Similarly, when the NST does not include core network resources for a record from records 300A-M, this record may include only a link to the second set of records 320A-P. In other embodiments, a record from the records 300A-M may include both links to the second set of records 310A-P and to the third set of records 320A-Q.

At operation 426, the customer system 110A selects based on the service description of the first service a subset of NSTs and a corresponding subset of the network operator systems 120A-N for deployment of the first service. In some embodiments, the selection of the subset of NSTs may include operations 426A and 426B. At operation 426A, the customer system 110A selects a first NST from the first set of NSTs 163A and the first network operator system 120A. At operation 426B, the customer system 110A selects a second NST from the second set of NSTs 163B and the second network operator system 120B.

While the embodiments herein are described with respect to the customer system 110A selecting two NSTs, one of ordinary skill in the art would understand that this is intended to be exemplary only and should not be considered a limitation of the present embodiments. In other exemplary embodiments, the customer system 110A may select one or any other number of NSTs from the set of NSTs 162 stored in the distributed ledger 164.

The selection of the subset of NSTs is performed based on the service description and based on the network characteristics of each NST retrieved from the distributed ledger 164. The customer system 110A may determine whether the access network specification and/or the core network specification of an NST satisfies the requirements set in the service description for the first service that is to be deployed. For a given NST, the customer system 110A determines whether the location of the access network defined in the access network specification, e.g., 312A, allows for sufficient coverage that meets the requirements indicated in the service description for the first service. In some embodiments, the customer system 110A may select the NST including the access network only when the capacity of the access network satisfies the requirements in the service description. In other embodiments, the customer system 110A may select the NST including the access network even when the capacity of the access network does not entirely satisfy the requirements of the service description. For example, the customer system 110A may determine that the location of the access network defined in access network specification 312A partially addresses the coverage requirements for the first service and may consequently select the NST that includes the access network specification 312A for instantiation in combination with one or more additional NSTs that provide the remaining access network capacity needed. The additional NSTs can be provided by the same or a different NOP than NOP 120A. In some embodiments, the selection of the NST can further be performed by verifying that the access network specification indicates a number of subscribers that is greater or equal than the number of subscribers that the first service intend to service.

The selection of the NSTs can further be performed based on the core network specification in comparison with the service description. The customer system 110A selects the NSTs that have core network specification, e.g., 322A, that is similar to the service description. In some embodiments, for each NST retrieved from the distributed ledger 164, the customer system 110A compares the service description of the first service with NST core network specification for similarity. The comparison is based on different method depending on how the information is stored in the distributed ledger 164. For example, a lexicographical matching or machine learning techniques (e.g., word-embedding based approaches, such as word2vec) can be used to find similarity between the service description of the first service and the core network specification(s). In some embodiments, the result of the comparison can be represented as a normalized value between 0 to 1, where 1 indicates a perfect match and 0 indicates that no match was found.

In some embodiments, the selection of the NSTs can be further performed based on the energy index associated with each one of the access network specification and the core network specification. In some embodiments, the energy index can be used to select one or more NSTs that provide a sustainable network infrastructure for the first service.

In some embodiments, the selection of the NSTs can further be performed based on the evaluation information for each network operator 125A-M. In some embodiments, the customer system 110A may select the NST associated with a network operator that has a higher evaluation information than other network operators when the multiple operators offer NSTs with similar characteristics that satisfy the service description.

In some embodiments, the selection of the NSTs from the NSTs can be performed based on pricing information stored in the records of the distributed ledger 164. In some embodiments, pricing information can be added to the records of the distributed ledger, first record 300A, record 310A and/or record 320A, indicating a price that the network operator 125A charges for deploying a respective NST. The pricing can be linked to the capacity of the access network and the number of UEs supported by the access network of the corresponding network slice network. Additionally or alternatively, network operators may set up different pricing models, e.g., per month or annual. The pricing information is taken into consideration when selecting the NSTs that are to be instantiated for forming the first service.

When the selection of the multiple NSTs and their corresponding NOP systems is completed, the operation move to operations 428. The customer system 110A transmits requests to instantiate the subset of NSTs on their corresponding subset of NOP systems as a subset of NSIs to form the first service deployed for the first customer 101A. For example, the customer system 110A is operative to perform operations 228A-B, when the first and the second NST are selected to be instantiated on the first and the second NOP systems 120A-B respectively as the first NSI 122A and the second NSI 122B for deployment of the first service.

At operation 428A the customer 110A requests instantiation of the first NST from the NOP system 120A to obtain the first NSI 122A. At operation 228B, the customer 110A requests instantiation of the second network slice template from the NOP system 120B to obtain the second NSI 122B. In some embodiments, the first and the second NOP system 120A-B can be operated by the same network operator 125A. In other embodiments, the first and the second NOP system 120A-B can be operated by two different network operators 125A-B.

At operation 230A, in response to receiving the request for instantiation of the NST each one of the NOP systems 120A-B instantiates the respective NSTs to obtain respective NSIs 122A-B. the respective NSIs 122A-B form the deployed first service. In some embodiments, one or more additional services (e.g., a second service) can be selected by the customer 110A or by another one of the customers 110A-L. The second service can be deployed by instantiation of one or more NSTs on the NOP systems 120A-N.

In some embodiments, the flow of operations may move to operation 430. At operation 430, the customer system 110A may record in the distributed ledger 164 evaluation information for the network operator. In some embodiments, the customer system 110A the evaluation information in customer feedback records 340A-H of the permissioned distributed ledger 164. The customer feedback records 340A-H are included in the customer tier 164B of the distributed ledger 164. The evaluation information represents an evaluation of usage of a network slice instance for a network operator system by the first customer 101A. For example, the evaluation information is indicative of how successful deployment of an NSI is. In some embodiments, the records 340A-H can be written to the distributed ledger 164 after the NSI reaches the end of lifetime, or alternatively when enough time has elapsed since the deployment of the NSI. If a customer is satisfied with an NSI, they will generally provide positive feedback, if not they will provide negative feedback. In the illustrated embodiment of FIG. 3B, following the instantiation of the first network slice instance 122A on the first NOP system 120A and usage of this instance for a given period of time by the first customer, the customer system 110A may record in the distributed ledger 164, the record 340A.

Multiple factors can be considered for evaluation of the deployed NSIs. Several objectives can be considered for defining the evaluation information. For example network-level technical key performance indicators such as latency crossing a threshold, or available throughput lower than requested, packet loss and jitter, can be used. Alternatively or additionally, subjective factors can be considered for defining the evaluation information such as complains of users of a customer for poor service. A qualitative or quantitative scale can be used for service satisfaction rating and determination of the role every objective factor plays to the calculation of the evaluation information. The evaluation information can be represented as a value in a quantitative scale in a record as illustrated in FIG. 3B. FIG. 3B illustrates a block diagram of an exemplary customer tier of records stored in a distributed ledger, in accordance with some embodiments. In this exemplary embodiment, each record 340 includes an identifier of the NSI (e.g., OP1.NST1.NSI1), a customer identifier, and the evaluation information (e.g., 4 in record 340A). In the illustrated example, the evaluation information is a value in a quantitative scale that represents an evaluation of the NOP after the customer has used an NSI instantiated on a system of the NOP for a determined period of time.

In a non-limiting example, the first service 140A is deployed based on two NSIs 122A and 122B on the respective NOP systems 120A and 120B that belong to distinct NOPs 125A-B respectively. In this exemplary deployment of the first service 140A, each one of the NSIs 122A-B is instantiated on its own core network. In some embodiments, the first service 140A provides access to the Internet to one or more subscribers through a cellular communication network. When a mobile device (UE) attaches to a mobile networks (e.g., NOP system 120A through the first NSI 122A), and in order for that UE to be able to have internet connectivity, a process of resolving a hardcoded canonical name of the Access Point Name (APN) to an Internet Protocol (IP) address is initiated. The resolution process involves a Domain Name Server (DNS) which can be on premises of the NOP system 120A, or it can be managed by a third-party. The IP address resolved is the IP address of the gateway, from which all the data packets received/transmitted by/from the UE are routed.

By default, the domain name server (DNS) resolves the same IP address for a given APN, i.e., the same physical network node. However, since the first service 140A is deployed over two core networks, there is potential for multiple gateways to exist. For example, when the UE connects access the first service 140A at the location that is served by the NOP system 120A and the first NSI 122A, the UE may connect to a first gateway that is hosted on the core network 123A. Alternatively, when the UE connects access the first service 140A at the location that is served by the NOP system 120B and the second NSI 122B, the UE may connect to a second gateway (that is different from the first gateway) that is hosted on a second core network of NOP system 120B. Therefore, the DNS resolution needs to be location-aware, in order to select the proper gateway from the corresponding NOP system that is closer to the UE.

In a first embodiment, the DNS resolution may be performed based on the geographical location of the UE. In this first embodiment, the DNS node receiving the DNS request identifies the location of the requestor's IP address (i.e., the IP address of the UE), then finds the address of a gateway server that closest to this location and returns its IP address.

In another embodiment, it is also possible to extend DNS standard to use a cell identifier and a canonical name in order to provide the IP address in response. Specifically, an example record such as the below:

| Name | Type | HNI-CellID-Value |
|---|---|---|
| apn.operator.com | A | 310410-170371082-132.122.21.3 |
| | | 310410-169108247-132.122.21.3 |
| | | 202005-2740557-12.23.21.2 |

In this case the address record resolves to multiple IP addresses, based on the operator identifier (core network identifier), and the cell identifier. Both of these are appended to the UE request for APN resolution, by the MME/AMF node of the network the UE attaches to.

Since the APN is used internally in an NOP system, this functionality can coherently implemented and a DNS server does not have to propagate APN records further into higher tier DNSs.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the disclosure may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of system 100 can be implemented on one or more network devices coupled through a physical network.

Figure 5:
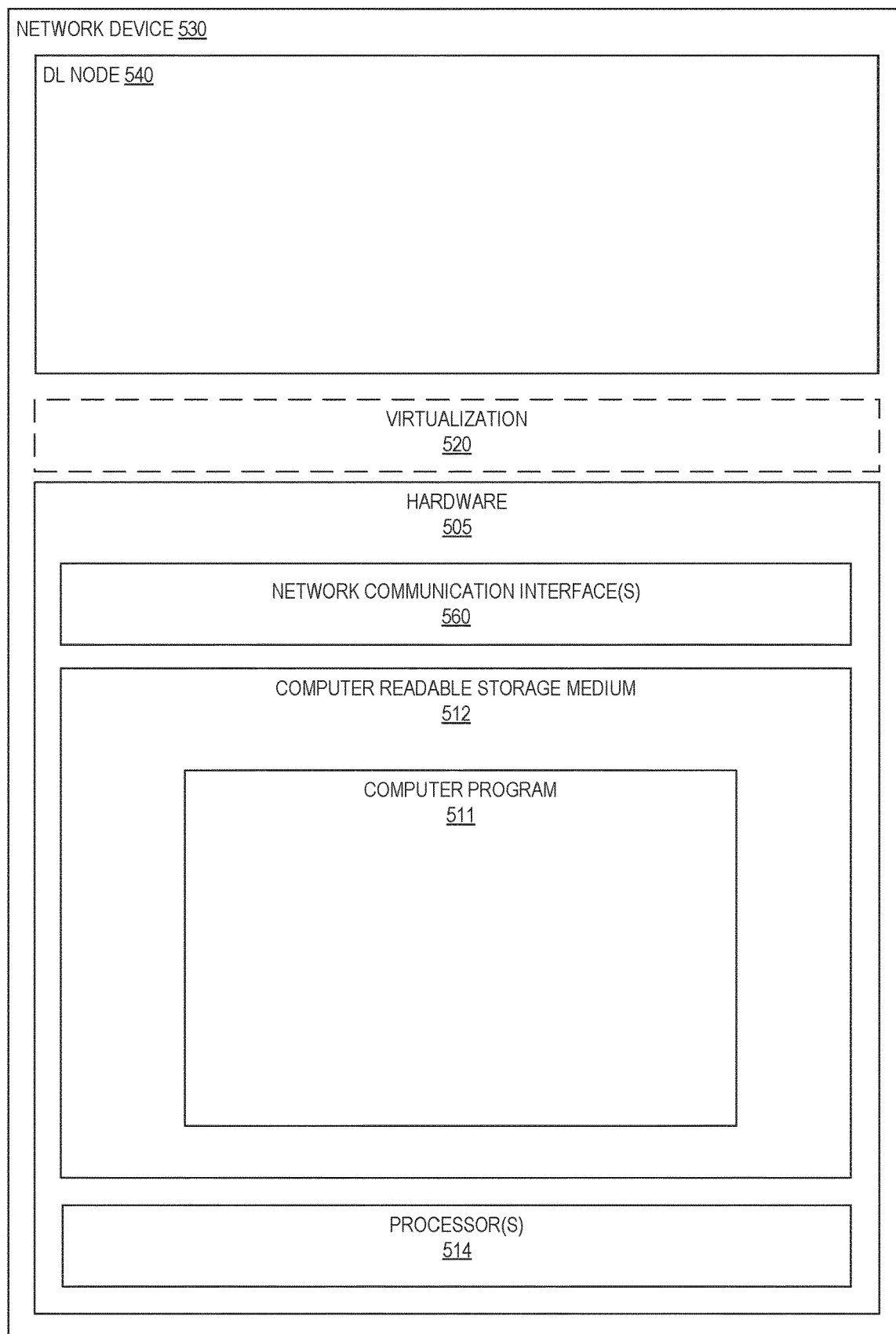
FIG. 5 illustrates a block diagram for a network device that can be used for implementing a DL node described herein, in accordance with some embodiments.

FIG. 5 illustrates a block diagram for a network device that can be used for implementing one or more of the DL nodes described herein, in accordance with some embodiments. According to one embodiment, the network device is an electronic device which includes hardware 505. Hardware 505 includes one or more processors 514, network communication interfaces 560 coupled with a computer readable storage medium 512. The computer readable storage medium 512 may include a computer program 511.

While one embodiment does not implement virtualization, alternative embodiments may use different forms of virtualization—represented by a virtualization layer 520. In these embodiments, the instance 540 and the hardware that executes it form a virtual server which is a software instance of the modules stored on the computer readable storage medium 512.

The computer program 511 includes instructions which when executed by the hardware 505 causes the instance 540 to perform the operations described with reference to FIGS. 1-4B. In this embodiment, each one of the DL nodes used by a participant in the DL network 104 is implemented on a single network device.

Figure 6:
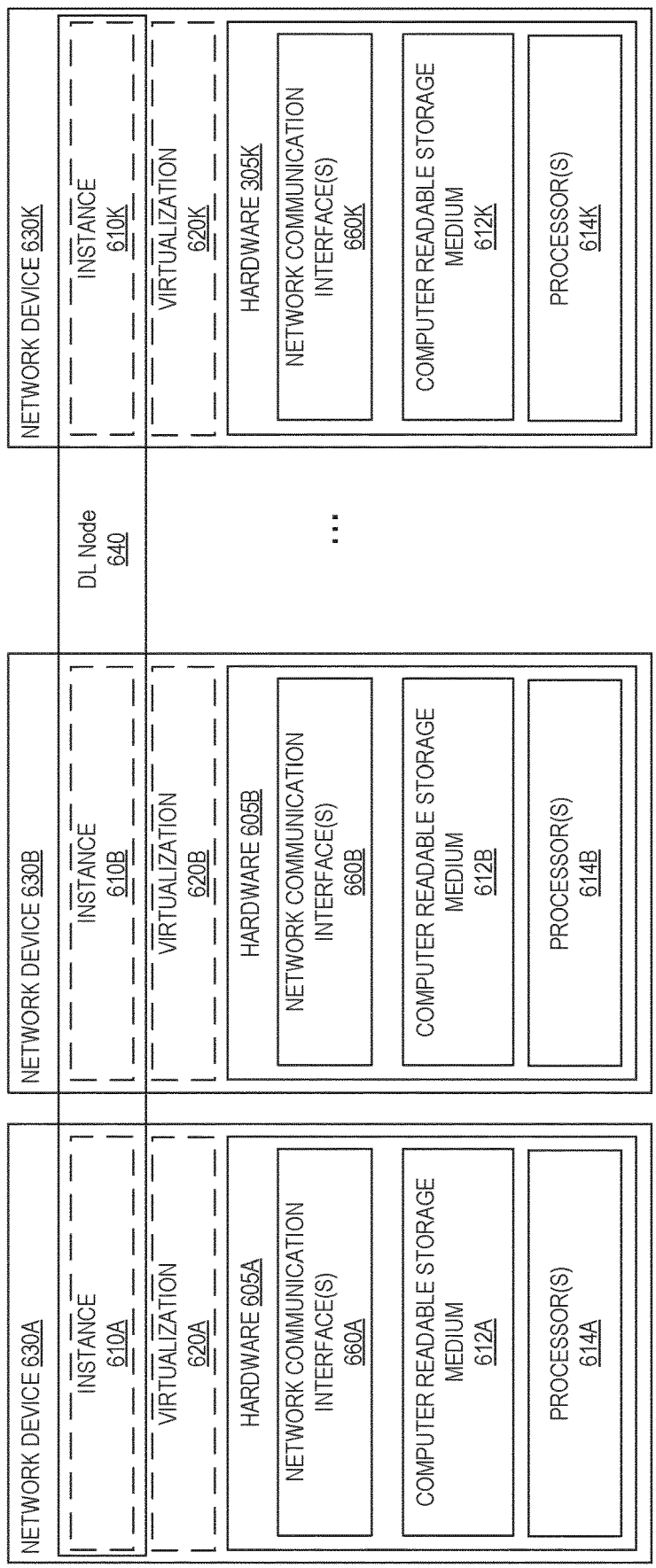
FIG. 6 illustrates a block diagram for network devices that can be used for implementing a DL node described herein, in accordance with some embodiments.

FIG. 6 illustrates an exemplary embodiment in which a node is implemented on multiple network devices. In the illustrated example, the DL node 609 is distributed over multiple network devices 630A-630K, where each network device has a similar architecture as network device 630. The multiple network devices 430A-430K are coupled through one or more links and can be located in a same geographical location or remote from one another. The operations described with reference to the embodiments of FIGS. 1-4B can be distributed over the multiple network devices, such as each network device is operative to perform a subset of the operations described herein. In some embodiments, each one of the DL nodes used by participants in the DL network 104 can be implemented as the DL node 609.

Figure 7:
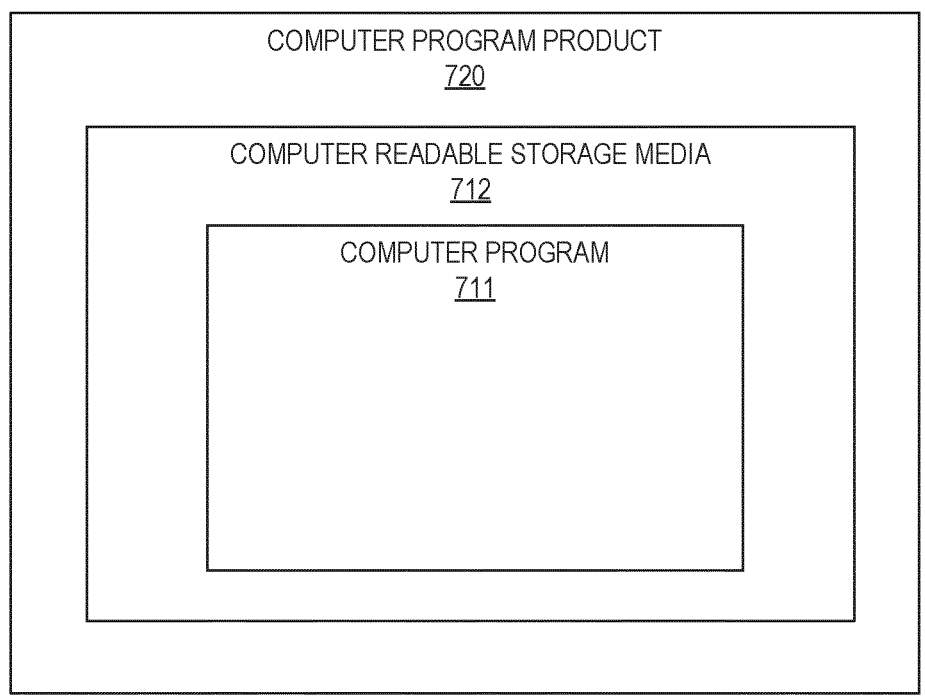
FIG. 7 illustrates a block diagram for a computer program product that can be used for deployment of services for customers in accordance with some embodiments.

FIG. 7 illustrates a block diagram for a computer program product that can be used for deployment of services for customers in accordance with some embodiments. FIG. 7 illustrates a computer program product 720, which includes computer readable storage media 712 that includes a computer program 711, which when executed by one or more processors performs operations that may comprise the operations of FIGS. 2A-B, or the operations of FIGS. 4A-B.

While the flow diagrams in the figures show a particular order of operations performed by certain embodiments of the disclosure, it should be understood that such order is exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

What is claimed is:

1. A method of deployment of a first service for a first customer, the method comprising:
   determining, from a permissioned distributed ledger that is distributed between network operator systems of network operators and customer systems, network slice templates that include respective descriptions of network characteristics that provide respective logical networks;
   selecting based on a service description of the first service a subset of the network slice templates and a corresponding subset of the network operator systems for deployment of the first service across the network operators, wherein the selecting comprising:
      selecting a first network slice template from a first set of network slice templates and a first network operator system; and
      selecting a second network slice template from a second set of network slice templates and a second network operator system; and
   requesting instantiation of the subset of the network slice templates on the corresponding subset of the network operator systems as a subset of network slice instances to form the first service deployed for the first customer by requesting instantiation of the first network slice template to obtain a first network slice instance with a first network operator and requesting instantiation of the second network slice template to obtain a second network slice instance with a second network operator to deploy the first service across the first network operator and the second network operator.

2. The method of claim 1, wherein each of the descriptions of network characteristics of each of the network slice templates of a corresponding network operator system includes:
   an access network specification that includes a description of the access network of the corresponding network operator system; and
   a core network specification that includes a description of service functions and physical resources for instantiation of the service functions for the corresponding network operator system.

3. The method of claim 1, wherein the permissioned distributed ledger includes a first set of records and each one of the first set of records includes a respective one of identifiers of the network operators, wherein each one of the first set of records is linked to a second set of records that includes access network specifications for the network slice templates, and each one of the first set of records is further linked to a third set of records that include core network specifications for the network slice templates.

4. The method of claim 3, wherein the first set of records, the second set of records, and the third set of records are stored in a network operator tier of the permissioned distributed ledger that is not accessible to the first customer for writing data.

5. A customer system for deployment of a first service for a first customer, the customer system comprising:
   one or more processors; and a computer readable storage medium storing a set of computer readable instructions that when executed by the one or more processors cause the customer system to perform operations to:
  determine, from a permissioned distributed ledger that is distributed between network operator systems of network operators and customer systems, network slice templates that include respective descriptions of network characteristics that provide respective logical networks;
  select based on a service description of the first service a subset of the network slice templates and a corresponding subset of the network operator systems for deployment of the first service across the network operators, wherein to select comprises:
    select a first network slice template from a first set of network slice templates and a first network operator system; and
    select a second network slice template from a second set of network slice templates and a second network operator system; and
  request instantiation of the subset of the network slice templates on the corresponding subset of the network operator systems as a subset of network slice instances to form the first service deployed for the first customer by requesting instantiation of the first network slice template to obtain a first network slice instance with a first network operator and requesting instantiation of the second network slice template to obtain a second network slice instance with a second network operator.

6. The customer system of claim 5, wherein to request the instantiation of the subset of the network slice templates to form the first service deployed for the first customer further comprises:
  transmit a first request to the first network operator to instantiate the first network slice template to obtain the first network slice instance; and
  transmit a second request to the second network operator to instantiate the second network slice template to obtain the second network slice instance.

7. The customer system of claim 5, wherein each of the descriptions of network characteristics of each of the network slice templates of a corresponding network operator system includes:
  an access network specification that includes a description of the access network of the corresponding network operator system; and
  a core network specification that includes a description of service functions and physical resources for instantiation of the service functions for the corresponding network operator system.

8. The customer system of claim 5, wherein the permissioned distributed ledger includes a first set of records and each one of the first set of records includes a respective one of identifiers of the network operators, wherein each one of the first set of records is linked to a second set of records that includes access network specifications for the network slice templates, and each one of the first set of records is further linked to a third set of records that include core network specifications for the network slice templates.

9. The customer system of claim 8, wherein the first set of records, the second set of records, and the third set of records are stored in a network operator tier of the permissioned distributed ledger that is not accessible to the first customer for writing data.

10. The customer system of claim 5, wherein the operations further to:
  record in customer feedback records of the permissioned distributed ledger evaluation information that represents an evaluation of usage of a network slice instance for a network operator system by the first customer.

11. The customer system of claim 10, wherein the customer feedback records are stored in a customer tier of the permissioned distributed ledger that is not accessible to the network operator systems for writing data.

12. The customer system of claim 5, wherein the permissioned distributed ledger is a permissioned blockchain.

13. A method of network slice instances provisioning, the method comprising:
  recording, in a permissioned distributed ledger that is distributed between network operator systems of network operators and customer systems, a first record that includes a first identifier of a first network operator and a first link to a second set of records and a second link to a third set of records;
  recording, in the permissioned distributed ledger, a second one of the second set of records that includes a first access network specification for one or more network slice templates of the first network operator system where the first access network specification includes a description of an access network of the first network operator system; and
  recording, in the permissioned distributed ledger, a third one of the third set of records that includes a first core network specification for a first network slice template of the first network operator system where the first core network specification includes a description of a first set of service functions and first physical resources for instantiation of the first set of service functions for the first network operator system.

14. A network operator system comprising:
  one or more processors; and
  a computer readable storage medium storing a set of computer readable instructions that when executed by the one or more processors cause the network operator system to perform operations to:
    record, in a permissioned distributed ledger that is distributed between network operator systems of network operators and customer systems, a first record that includes a first identifier of a first network operator and a first link to a second set of records and a second link to a third set of records;
    record, in the permissioned distributed ledger, a second one of the second set of records that includes a first access network specification for one or more network slice templates of the first network operator system where the first access network specification includes a description of an access network of the first network operator system; and
    record, in the permissioned distributed ledger, a third one of the third set of records that includes a first core network specification for a first network slice template of the first network operator system where the first core network specification includes a description of a first set of service functions and first physical resources for instantiation of the first set of service functions for the first network operator system.

15. The network operator system of claim 14, wherein the operations further to:
  record, in the permissioned distributed ledger, a fourth one of the second set of records that includes an updated first access network specification for the one or more network slice templates of the first network operator system.

16. The network operator system of claim 14, wherein the operations further to:
  record, in the permissioned distributed ledger, a fifth one of the third set of records that includes a second core network specification for a second network slice template of the first network operator system that is different from the first network slice template of the first network operator system, wherein the first network slice template and the second network slice template are linked to the second one of the second set of records.

17. The network operator system of claim 14, wherein the permissioned distributed ledger is a permissioned blockchain.

* * * * *